(12) United States Patent
Kerin et al.

(10) Patent No.: US 7,484,774 B2
(45) Date of Patent: Feb. 3, 2009

(54) REDUNDANT LATCH/VERIFIER FOR A QUICK CONNECTOR

(75) Inventors: Jim Kerin, Grosse Pointe Woods, MI (US); Richard M. Pepe, Macomb, MI (US); Robert A. Koshay, Macomb, MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 387 days.

(21) Appl. No.: 11/411,504

(22) Filed: Apr. 26, 2006

(65) Prior Publication Data

US 2008/0007053 A1    Jan. 10, 2008

Related U.S. Application Data

(60) Provisional application No. 60/677,157, filed on May 3, 2005.

(51) Int. Cl.
*F16L 37/00* (2006.01)
(52) U.S. Cl. .............................. 285/305; 285/93; 285/82
(58) Field of Classification Search ................. 285/305, 285/319, 93, 82
See application file for complete search history.

(56) References Cited

U.S. PATENT DOCUMENTS

| | | | |
|---|---|---|---|
| 4,591,192 A | 5/1986 | Van Exel et al. | |
| 5,401,063 A | 3/1995 | Plosz | |
| 5,423,577 A | 6/1995 | Ketcham | |
| 5,452,924 A | 9/1995 | Kujawski | |
| 5,542,716 A * | 8/1996 | Szabo et al. | 285/305 |
| 5,586,792 A | 12/1996 | Kalahasthy et al. | |
| 5,593,187 A | 1/1997 | Okuda et al. | |
| 5,628,531 A | 5/1997 | Rosenberg et al. | |
| 5,649,724 A | 7/1997 | Wiethorn | |
| 5,782,502 A | 7/1998 | Lewis | |

(Continued)

FOREIGN PATENT DOCUMENTS

| | | |
|---|---|---|
| EP | 0 728 981 A | 8/1996 |
| EP | 1 359 361 A | 11/2003 |
| WO | WO 2006/074719 A1 | 7/2006 |

OTHER PUBLICATIONS

Quick Connectors, http://www.togoh.co.jp/english/products_9.htm, Copyright 2001 Togo Seisakusyo Corporation.

*Primary Examiner*—David E Bochna
(74) *Attorney, Agent, or Firm*—Leydig, Voit & Mayer Ltd.

(57) ABSTRACT

A quick connector coupling comprising a connector body, a tubular male member with an upset, a primary retainer and a separate redundant latch/verifier. The connector body defines a through bore and the male member extends into the bore. The primary retainer releasably secures the male member within the connector body. The redundant latch/verifier is releasably coupled to the connector body and movable between an unlatched position and a latched position. It includes spaced apart fingers with verifying tabs that permit movement to the latched position only after full insertion of the male member. The fingers have release tabs to manually spread the extension beams. In another form, the connector body includes locking pads extending radially inward. The legs of the primary retainer are located inward of the locking pads preventing the legs from moving to a released position if said male member is pulled in a direction to remove it from the connector body.

39 Claims, 11 Drawing Sheets

U.S. PATENT DOCUMENTS

| | | |
|---|---|---|
| 5,855,398 A | 1/1999 | Reinholz |
| 5,863,077 A | 1/1999 | Szabo et al. |
| 6,637,779 B2 | 10/2003 | Andre |
| 6,802,491 B1 | 10/2004 | Kelly et al. |
| 6,846,021 B2 | 1/2005 | Rohde et al. |
| 6,866,303 B2 | 3/2005 | Szabo et al. |
| 6,905,143 B2 | 6/2005 | Klinger et al. |
| 7,014,220 B2 | 3/2006 | Szabo et al. |
| 7,055,869 B2 | 6/2006 | Malone |
| 7,128,347 B2 * | 10/2006 | Kerin ……………… 285/305 |
| 7,390,025 B2 * | 6/2008 | Pepe et al. …………….. 285/93 |
| 2004/0036283 A1 | 2/2004 | Furuya |
| 2005/0218650 A1 | 10/2005 | Pepe et al. |
| 2006/0082144 A1 | 4/2006 | Okada |
| 2006/0082145 A1 | 4/2006 | Steveley |
| 2006/0157978 A1 | 7/2006 | Szabo et al. |
| 2006/0170211 A1 | 8/2006 | Matsubara |

* cited by examiner

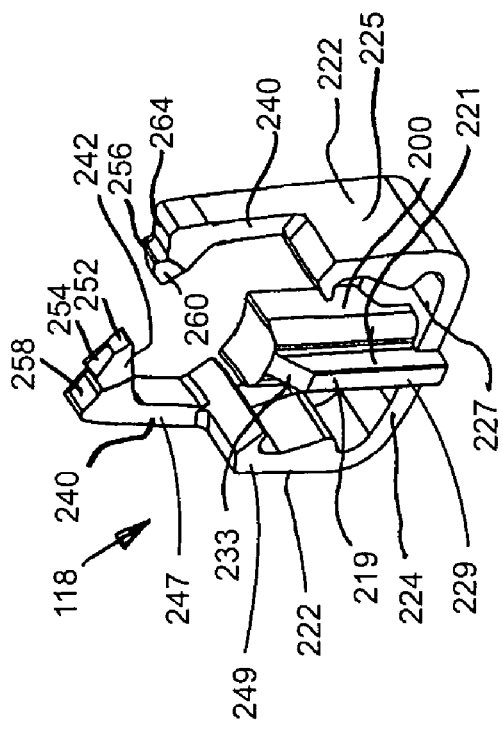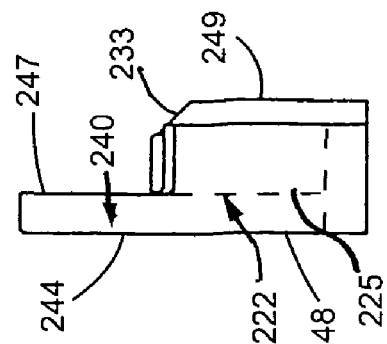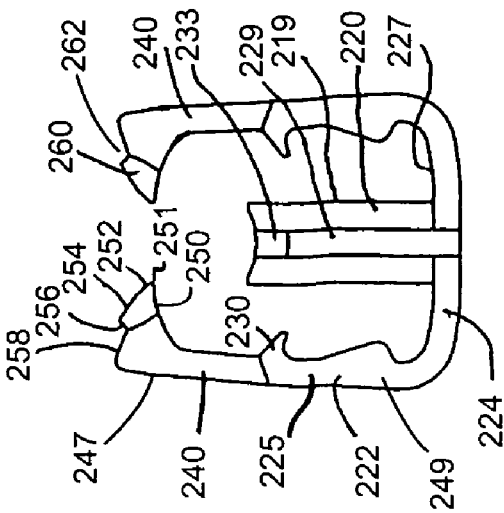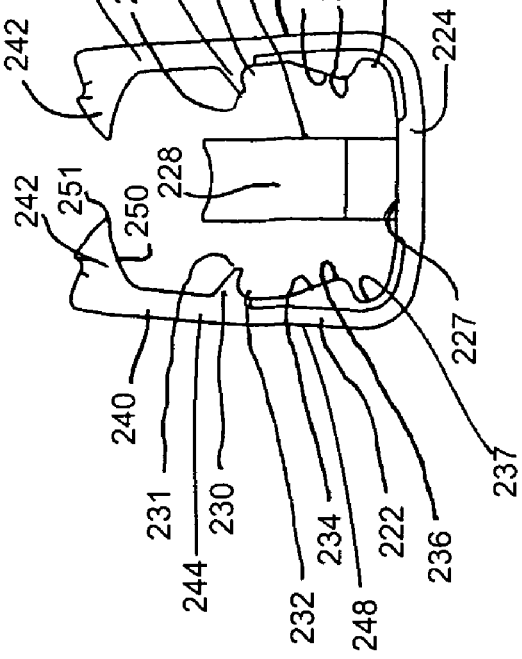

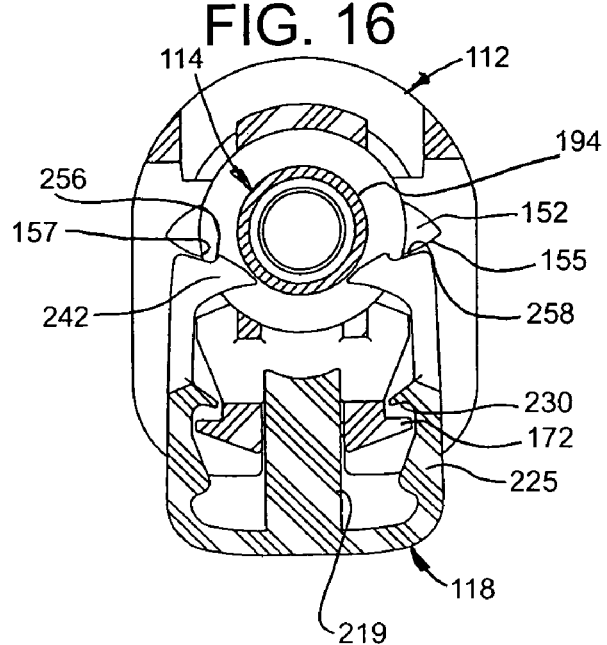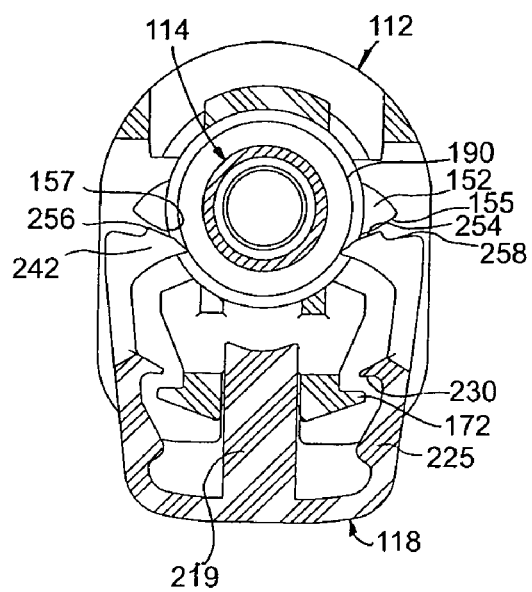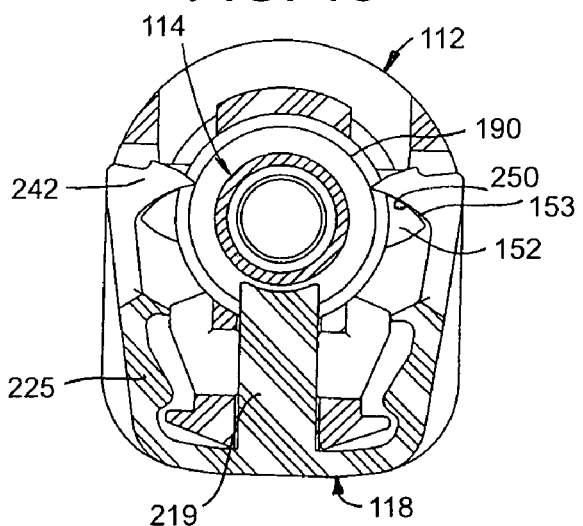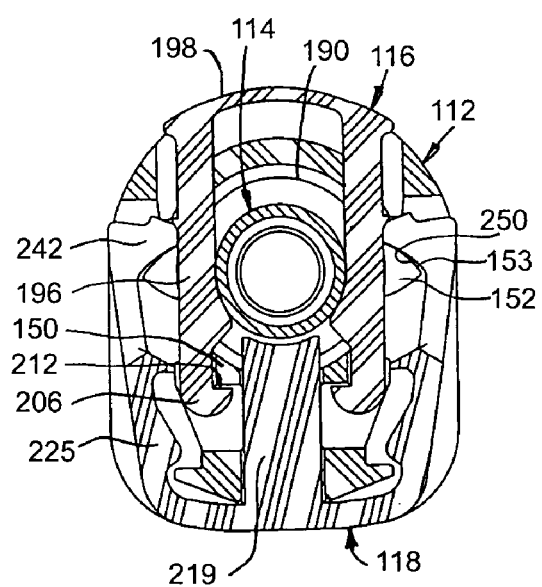

REDUNDANT LATCH/VERIFIER FOR A QUICK CONNECTOR

This application claims priority pursuant to 35 U.S.C. §120 to U.S. Provisional Application No. 60/677,157, filed May 3, 2005.

BACKGROUND OF THE INVENTION

This invention relates to fluid line systems which include quick connector couplings, and more particularly to a quick connector coupling having a redundant latch/verifier.

In automotive and other fields, quick connector couplings, which generally include a male member received and sealingly retained in a female connector body, are often utilize to provide a fluid connection between two components or conduits, thus establishing a fluid line between the two components. Use of quick connector couplings is advantageous in that a sealed and secured fluid line may be established with a minimum amount of time and expense.

A number of methods and mechanisms exist for securing the male member and female connector body of a quick connector coupling together.

One type of retention mechanism involves use of a retainer in the form of a retention lip inserted through slots formed in the exterior of the connector body. Beams extending through the slots are poised between the male member upset and the rearward surfaces defining the slots, thereby preventing disconnection of the coupling. Due to the physical appearance of such retainers, they are referred to in the trade as "horseshoe" retainers. An example of this type of retainer is found in U.S. Pat. No. 5,586,792, to Kalahassthy et al., which is herein incorporated by reference. The "horseshoe" retainer, disclosed in the '792 patent, permits easy release of the coupling without significantly increasing the complexity of the coupling. Application for U.S. Ser. No. 11/087,358 filed Mar. 23, 2005 disclosed various arrangements of connectors with horseshoe type retainers and a redundant latch/verifier. The disclosure of that application is incorporated by reference herein.

The quick connector coupling of the present invention is an alternative of the type of connector disclosed in the '792 patent and the application Ser. No. 11/087,358. The arrangement of the present invention provides the benefit that on assembly of the quick connector coupling, the redundant latch/verifier cannot be moved to its latched position unless the associated tube is in its fully inserted position. Its position thereby provides a physical and visual indication that the tube is not fully inserted. The arrangement of the present invention also provides the benefit that the legs of the primary retainer cannot be accidentally moved from their locked position to their unlocked position if the male member is pull in the forward direction relative to the connector body and then the male member is twisted or rotated around its axis.

Once placed in the latched position, the redundant latch/verifier prevents unintentional release of the tube by the primary retainer. The redundant latch/verifier is also able to independently retain the male member of the tube in the connector body should the primary retainer fail.

BRIEF DESCRIPTION OF THE DRAWINGS

FIG. 12 is a perspective view of the redundant latch/verifier of the quick connector coupling assembly of FIG. 1.

FIG. 13 is a rear view of the redundant latch/verifier of FIG. 12.

FIG. 14 is a side view of the redundant latch/verifier of FIG. 12.

FIG. 15 is a front view of the redundant latch/verifier of FIG. 12.

FIG. 16 is a sectional front view of the quick connector coupling assembly of FIG. 1 taken along line 16-16 in FIG. 1, with the primary retainer removed for clarity, showing the male member partially inserted into the connector body and the redundant latch/verifier in its unlatched position.

FIG. 17 is a sectional front view similar to FIG. 16, on an enlarged scale, showing the male member fully inserted into the connector body and the redundant latch/verifier in an intermediate position between its unlatched position and its latched position.

FIG. 18 is a sectional front view similar to FIG. 16, showing the male member fully inserted into the connector body and the redundant latch/verifier in its latched position.

FIG. 19 is a sectional front view similar to FIG. 16, showing the male member fully inserted into the connector body and the primary retainer locked into its latched position with the redundant latch/verifier latched to retain the tube within the connector body.

DETAILED DESCRIPTION OF THE ILLUSTRATED EMBODIMENTS

The quick connector coupling of the present invention is illustrated in connection with a fluid line system. It is shown as a releasable connection between a rigid tube and other fluid carrying components, particularly a flexible hose. However, the coupling has numerous other applications where a fluid tight, but releasable connection is desired, such as connection of rigid elements of a fluid path, whether pressurized, or unpressurized. One example is an automotive vehicle fuel delivery system another example is a fuel filler pipe arrangement for a vehicle. Another example is a fuel filler pipe arrangement for a vehicle.

Figure 1:
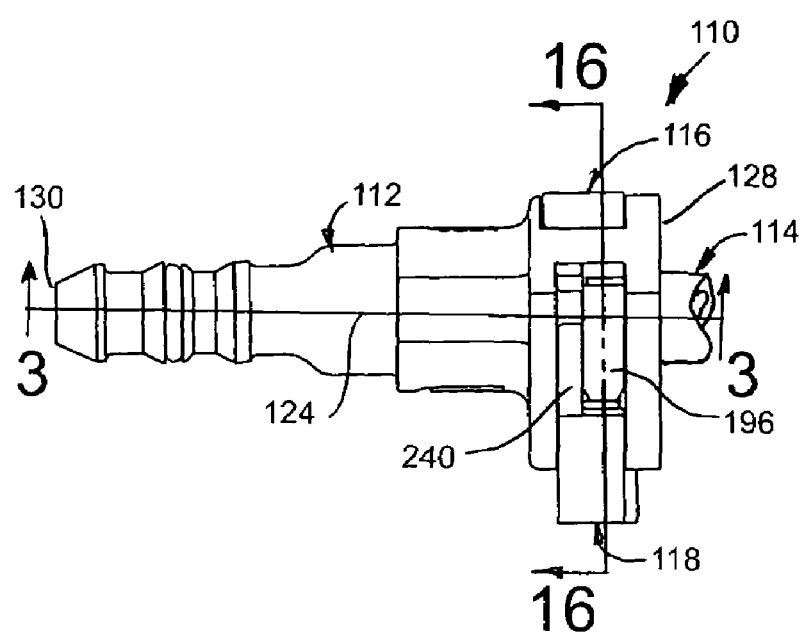
FIG. 1 is a side view of a quick connector coupling assembly embodying the features of the present invention.
Figure 2:
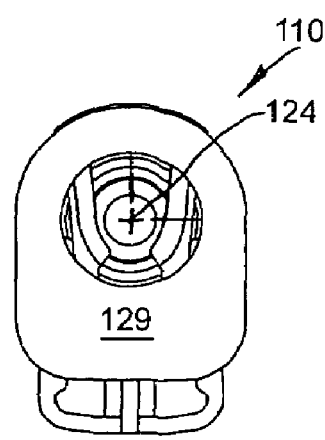
FIG. 2 is a front view of the quick connector coupling assembly of FIG. 1.
Figure 3:
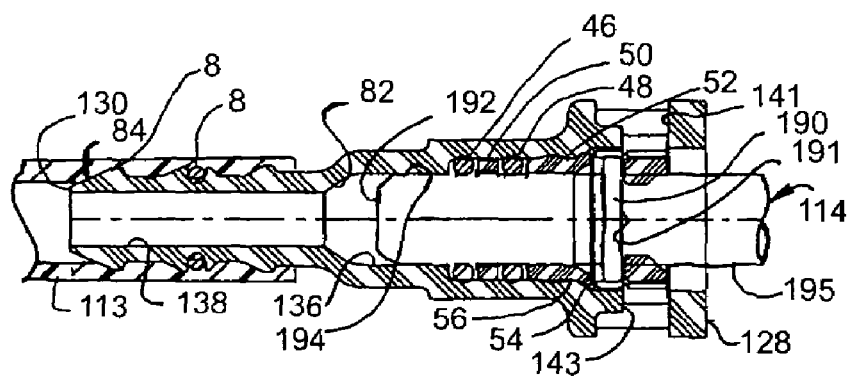
FIG. 3 is a sectional bottom view of the quick connector coupling assembly of FIG. 1 taken along line 3-3 of FIG. 1.

FIGS. 1-3 illustrate a quick connector coupling 110 for forming a severable connection in a fluid line. The coupling 110 is comprised of a generally cylindrical female connector body 112 and a male member 114, best seen in FIG. 3, releasably secured together by a primary retainer member 116 and separate a redundant latch/verifier member 118. The male member 114 is formed at an end of a hollow tube which forms a part of a fluid line system. In use, the female connector body 112 is connected to a tubing or hose 113 seen in FIG. 3 which is also a part of the fluid line system. The female connector body 112 and the male member 114 are connectable to form a permanent, but severable, joint in the fluid line.

As illustrated in FIG. 3, the male member 114 is formed at the end of a rigid tube. It includes a radially enlarged upset 190 defining a radial abutment surface 191 at a given distance from an open tube end or tip 192. The tube end or tip 192 can be rounded or tapered to make insertion of the male member 114 into the connector body 112 less difficult. A smooth generally cylindrical sealing surface 194, defined by the exterior surface of the tube, extends between the upset 190 and the tube end 192. The tube continues in a direction away from the tube end beyond upset 190 and defines a generally smooth cylindrical surface 195. It is generally the same diameter as the cylindrical sealing surface 194.

Figure 4:
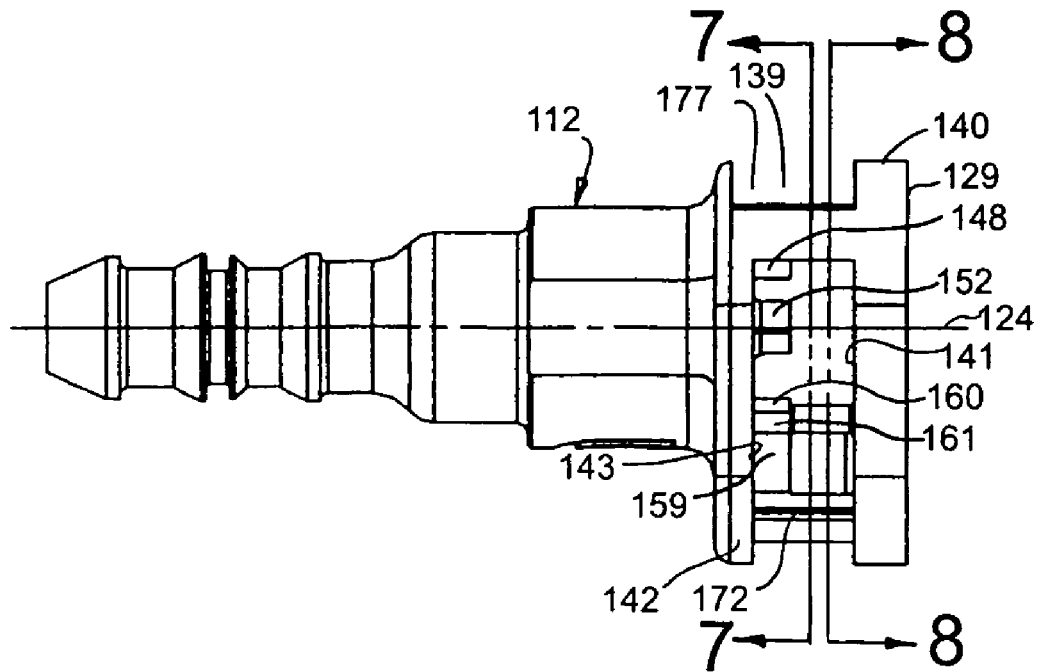
FIG. 4 is a side view of the connector body of the quick connector coupling assembly of FIG. 1.
Figure 6:
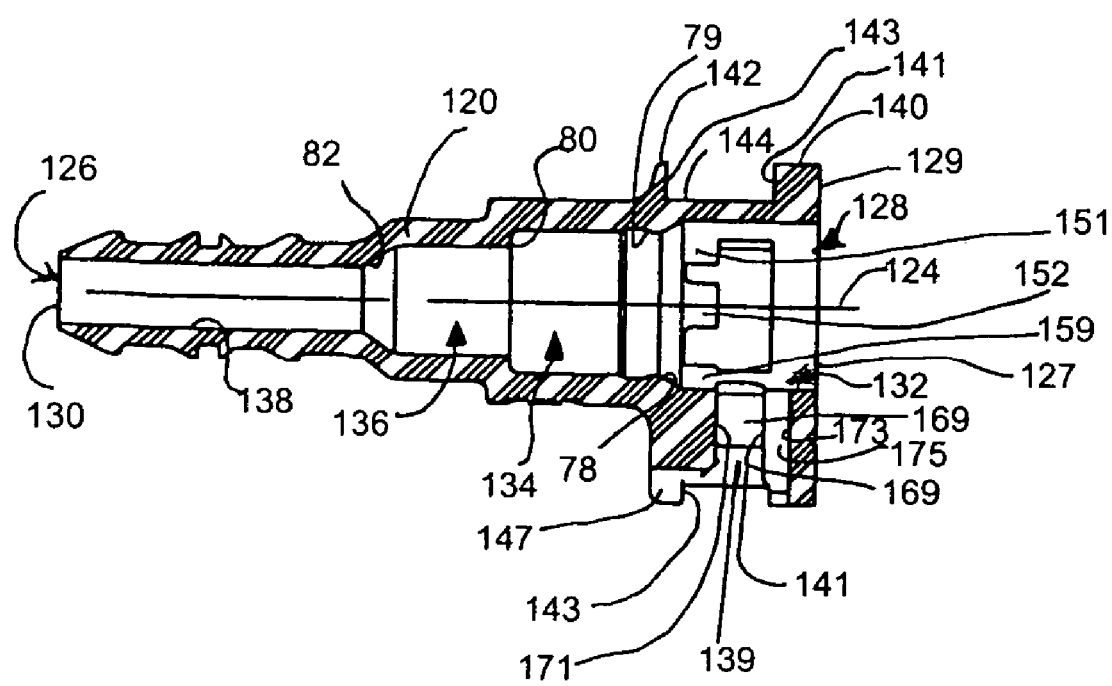
FIG. 6 is a sectional side view of the connector body of FIG. 4, taken along line 6-6 of FIG. 5.
Figure 5:
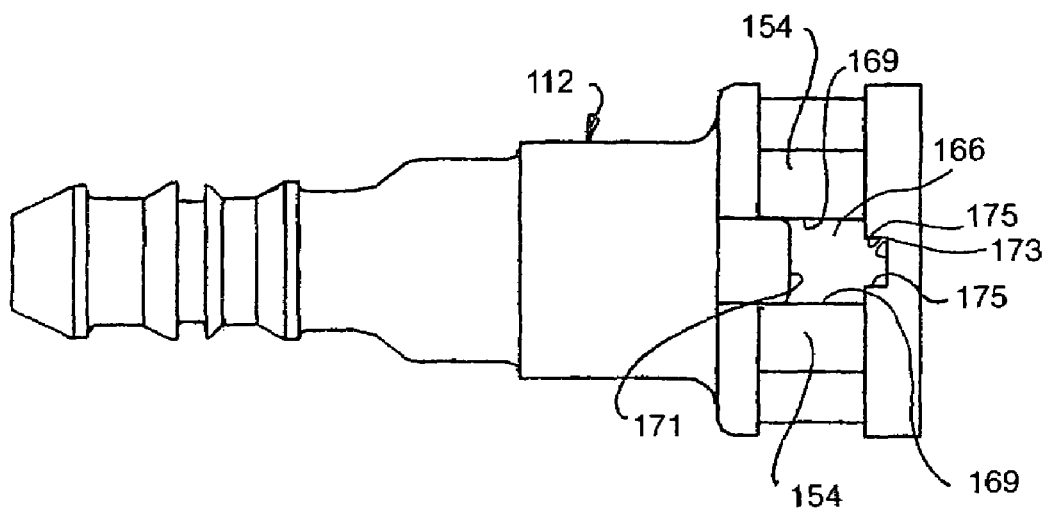
FIG. 5 is a bottom view of the connector body of FIG. 4.

The connector body 112 is illustrated in detail in FIGS. 4-7. As best seen in FIGS. 4-6, the connector body 112 is defined by a generally cylindrical, stepped radially inner surface of wall 120. The illustrated connector body 112 is preferably molded of a plastic material, such as polyamide. It must be understood that the body exterior may take any desired shape without departing from the invention. It could, for example, include a 90° bend between its ends, which is a common shape for a connector body.

The interior surface of wall 120 defines a through bore 126 centered about a longitudinal axis 124, as illustrated in FIG. 6. It should be noted that the term axial and axially as used herein means longitudinally along the central axis 124. The terms lateral, laterally, transverse and transversely mean in a plane generally perpendicular to the axis 124 toward and away from the axis.

The bore 126 of connector body 112 extends completely through the connector body 112, from a larger diameter, male member reception end 128 to a smaller diameter, hose connection end 130. Variations in the diameter of wall 120 of connector body 112 divide through bore 126 into distinct sections. Moving axially rearward from the male member reception end 128 to the hose connector end 130, they are: retainer housing section 132, seal chamber 134, tube end receptacle 136, and fluid passageway 138. It should be noted that the term rearward is used herein to mean in a direction axially from male member reception end 128 toward the hose connection end 130 generally along the central axis 124. The term forward means in a direction axially from the hose connection end 130 toward the male member reception end 128 generally along the central axis 124.

Figure 7:
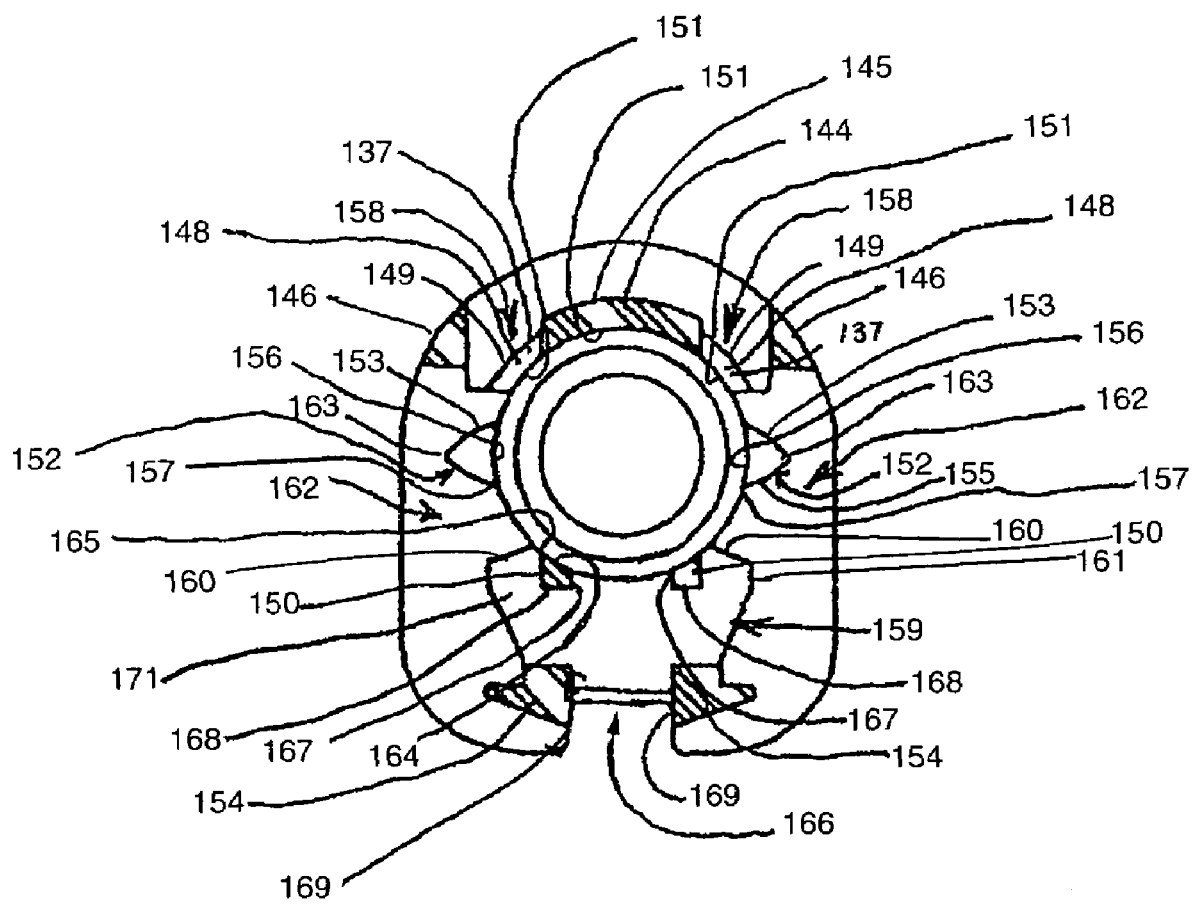
FIG. 7 is a sectional front view of the connector body of FIG. 4, taken along line 7-7 of FIG. 4.
Figure 8:
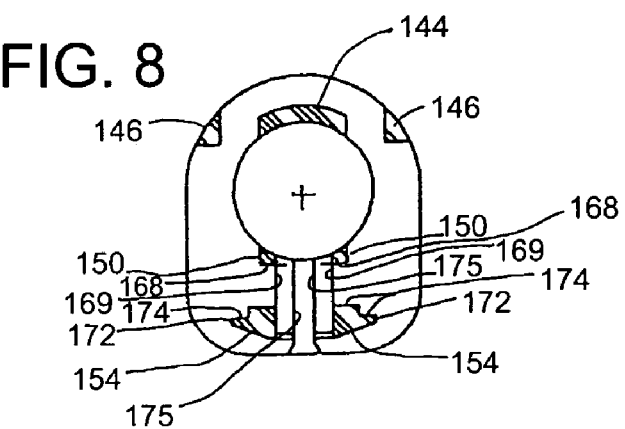
FIG. 8 is a sectional rear view of the connector body of FIG. 4, taken along line 8-8 of FIG. 4.

The retainer housing section 132 is adjacent to the male member reception end 128. It is defined by a forward rim 140 having a transverse planar forward facing surface 129 that defines the entrance hole or opening 127 to through bore 126 at the male reception end 128. Forward rim 140 is spaced from a rearward rim 142 separated by a gap or space 139 open to through bore 126. The axial extent of the space 139 is defined by a rearward facing surface 141 of the forward rim 140 and a forward facing surface 143 of the rearward rim 142. These surfaces 141, 143 are connected by an arcuate top support member 144, two side support members 146, two center support members 150, and two bottom support members 154, as illustrated in FIGS. 7 and 8. A notch 147 is defined at the bottom of the rearward rim 142. The upper curved surface of top support member 144 is somewhat recessed radially inward from the radially outward most edge of the rearward rim 142. The top support member 144 and the surfaces 141,143 define a pocket 177 that receives a cross member of the primary retainer 116.

It should be noted that for purpose of clarity, the quick connector coupling 110 is shown with its longitudinal extent positioned in a horizontal plane and the terms "top," "bottom" and "sides" have been used in describing the connector body 116. It will become understood that the "top" configuration is associated with the primary retainer 116 and the bottom configuration is associated with the redundant latch/verifier 118. However, in use, the connector coupling 110 can reside in any orientation without regard to the horizontal and vertical planes and "top" and "bottom" are only relevant to the illustration herein.

The spaces 139 between the top support member 144 and the two side support members 146 define a pair of first or top slots 158. The space 139 between the two center support members 150 and the two bottom support members 154 defines a second or bottom slot 166 directly opposite from top support member 144. The spaces 139 between the two side support members 146 and bottom support members 154 define a pair of third or side slots 162. The slots 158, 162, and 166 are open to the throughbore 126.

The top slots 158 receive and position the legs of the primary retainer 116 transversely to the central axis 124 of the connector body 112. The bottom slot 166 receives and positions a beam of the redundant latch/verifier 118 transversely to the central axis 124 of the connector body 112. Elements of both the primary retainer 116 and the redundant latch/verifier 118 reside in side slots 162.

As best seen in FIGS. 6-7, the forward facing surface 143 of the rearward rim 142 of the connector body 112 includes a series of forward extending axial protrusions or body posts 148, 152, and 159, partially filling the space 139 between the rims 140 and 142. These protrusions or body posts are integrally molded into the connector body. A pair of first or upper body posts 148 are disposed at the lateral ends of curved top wall 144. These upper body posts 148 each include a top curved surface 149. An inner curved surface 151 extends under the upper body posts 148 and the top support member 144. The upper body posts 148 include forward facing surfaces 137, best seen in FIG. 7, that face the rearward facing surface 141 of the forward rim 140.

A pair of second or central parabolic shaped body posts 152 include a tip or apex 163 disposed laterally on either side of through bore 126 at approximately 180° (degrees) apart. The parabolic shaped central body post 152 points radially outward and include an upper curved surface 153 and a lower curved surface 155 which join at the apex 163 that resides in a generally horizontal plane that approximately passes through central axis 124. Each central body post 152 further includes a radially inward curved surface 156 that is formed on the same radius of curvature as the radially inner curved surface 151 of the first body posts 148 and the top support member 144. Inner curved surface 156 intersects the lower curved surface 155 at catch 157.

A third or bottom protrusion or plateau 159 is a solid portion of the body 112 that extends between center support members 150 and the bottom support members 154. It defines a planar surface 171, best seen in FIGS. 6 and 7, that faces forward towards the rearward facing surface 141 of the front rim 140. The bottom protrusion 159 includes spaced ledges 160 extending transversely outward from center support members 150 at an angle downward in the direction toward the bottom support members 154. The radial or lateral outward extent of bottom protrusion 159 is defined by spaced side walls 161 that are parallel for a short distance and then converge toward the bottom support members 154.

The bottom protrusion 159 further includes radially inner curved surface 164 on the same radius of curvature as the radially inner curved surface 151 defined by upper body posts 148 and curved top support member 144 and the inner curved surfaces 156 of central body posts 152. The inner curved surfaces 151, 156, and 164 are segments of a cylinder and define an upset receiving pocket 165.

The bottom slot 166 includes an enlarged portion that extends laterally between spaced inward facing surfaces 167 of center support members 150 and spaced inward facing surfaces 169 of bottom support members 154, best seen in FIGS. 5 and 7, and a narrowed portion, best seen in FIGS. 5 and 8 that extends transversely between lateral surfaces 175. The lateral surfaces 175 are parallel to each other and to surfaces 169 and extend to internal bore 126. The cross section of the bottom slot 166 is generally "T" shaped. The planar surface 171 of the bottom protrusion 159 defines the rearward most surface of the bottom slot 166. A forward most surface 173 defines the front of the bottom slot 166 as seen in FIGS. 5 and 6.

Each of the center support members 150 defines a locking shoulder 168, best seen in FIG. 7. It will coaction with the primary locking retainer 116 as will be explained.

A locking ridge 172 extends laterally from the outer edge of each bottom support member 154 and defines a flat 174 as shown in FIGS. 7 and 8. As shown in FIG. 4, the locking ridge 172 extends axially from the rearward facing surface 141 of the front rim 140 to the forward facing surface 143 of the rear rim 142. The locking ridge functions with the redundant latch/verifier as will be the explained.

The seal chamber 134 is formed axially rearward of the retainer housing section 132. It is defined by a reduced diameter portion of wall 120, relative to the retainer housing section 132. It extends axially rearward from a conical shoulder 78 to a radial shoulder 80. An annular recess 79 is provided in wall 120 axially rearward of the shoulder 78. The seal chamber 134 is provided to house sealing elements to form a fluid seal between the connector body 112 and the male member 114.

As illustrated in FIG. 3, situated radially in between the male member 134 and the seal chamber 134 are two O-ring seals 46 and 48 separated by a rigid spacer ring 50. The O-rings 46 and 48 are sized to fit tightly within the seal chamber 134 and tightly around the sealing surface 194 of the male member 114. The O-rings 46 and 48 are secured in the seal chamber 134 by a hollow spacer sleeve 52. The spacer sleeve 52 has a conically enlarged end 54 which seats against the conical shoulder 78 of wall 120 to position the sleeve 52 within bore 126. To provide enhanced securement of the spacer sleeve 52 within the bore 126, a raised annular portion 56 is formed in the outer periphery of sleeve 52. The raised portion 56 is matingly received in the recess 79 formed in the wall 120 to lock the sleeve 52 in place.

The tube end receptacle 136 is formed axially rearward of the seal chamber 134. It is defined by a reduced diameter portion of wall 120, relative to seal chamber 134, which extends axially rearward from the small diameter end of radial shoulder 80 to a conical shoulder 82. The tube end receptacle 136 is sized to receive, and pilot or guide the male member 114 sealing surface 194.

The fluid passageway 138 is defined by the smallest diameter portion of wall 120. It leads from the small diameter end of conical shoulder 82 to the hose connection end 130. The portion of wall 120 surrounding fluid passageway 138 is configured to facilitate connection to another component in the fluid line. The illustrated connector body 112, for example, is specially formed for connection to flexible hose 113 and includes radial barbs 85 and a groove housing an O-ring seal 84 to seal against the interior of hose 113. Of course, as previously discussed, any other suitable connection arrangement can be used to complete a fluid system.

Figure 9:
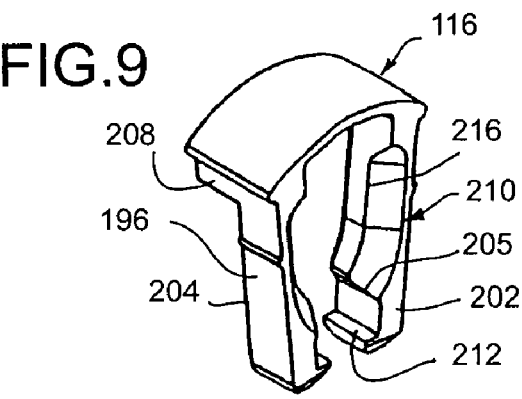
FIG. 9 is a perspective view of the primary retainer of the quick connector coupling assembly of FIG. 1.
Figure 10:
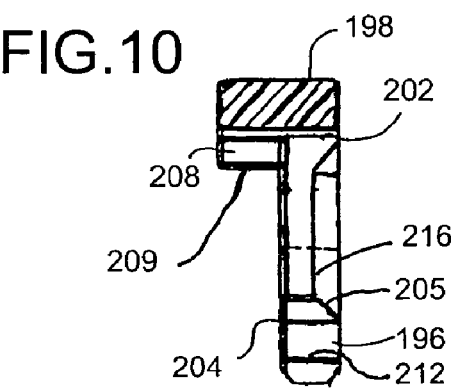
FIG. 10 is a sectional side view of the primary retainer of FIG. 9.
Figure 11:
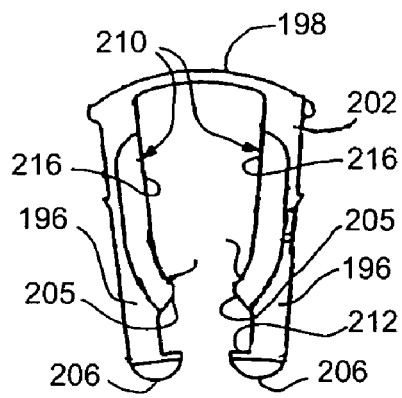
FIG. 11 is a front view of the primary retainer of FIG. 9.

The primary "horse-shoe" type retainer 116 is illustrated in detail in FIGS. 9-11. It is preferably molded of a resilient, flexible material, such as plastic. The primary retainer 116, which extends transversely through the top slots 158 of retainer housing section 132, is demountably coupled to the connector body 112.

The primary retainer 116 includes a pair of elongated, generally parallel legs 196 extending from, and joined at one end by, a cross member 198. Release protrusions 208 are formed on the radially inner surface of cross member 198. The release protrusions 208 extend axially from the rearward face 204 of legs 196 a distance approximately equal to the axial length of upper body posts 148 on either side of the top support member 144. The release protrusions 208 define ramped or camming surfaces 209 that support the central area of cross member 196 in spaced relation to top support member 144 once the primary retainer 116 has been attached to the connector body 112. The cross member 198 provides a separation between the legs 196 approximately equal to the outer diameter of the cylindrical sealing surface 194 of male member 114. The legs 196 have an axial length approximately equal to, but slightly less than (to allow clearance), the axial length of the top slots 158 between transverse ends 139 of upper body posts 148 and rearward facing surface 141. The lateral width of the legs 196 is significantly less than the lateral width of the top slots 158, in order to allow outward expansion of the legs 196 to permit male member insertion and release as will be understood.

The cross member 198 has an axial length substantially greater than that of the legs 196. As illustrated in FIG. 10, the cross member 198 is axially aligned with forward faces 202 of the legs 196, but extends axially beyond the rearward faces 204 of the legs 196.

Each leg 196 includes a latch 206 formed at an end remote from the cross member 198. When the primary retainer 116 is fully inserted into the connector body 112, the latches 206 lock the primary retainer 116 into position relative to the connector body 112. Latching edges 212, defined by the latches 206, engage the locking shoulders 168, defined by the center support members 150 of the connector body 112, to releasably lock the primary retainer 116 in place. Each leg 196 includes an angled surface 205 seen in FIGS. 9 and 10 that coacts with upper lateral outward edges of center support members 150 to urge the primary retainer upward. The resilient property of the legs 196 assures this relationship.

Lead areas 210 are formed into the forward faces 202 of legs 196. These areas 210 slope radially inward and axially rearward from the forward face 202 of each leg, and terminate approximately midway between the forward face 202 and the rearward face 204 of each leg. The spacing between the lead edges of lead areas 210 is at its greatest adjacent the forward face 202. Here, the spacing is approximately equal to the outer diameter or outer perimeters surface of the upset 190 formed on the male member 114. At the inner edges 216 of the lead areas 210, the spacing between the lead areas 210 is approximately equal to the outer diameter of the sealing surface 194 of the male member 114. The portions of the lead areas 210 closer to the latches 206 curve inwardly at 218 to match the annular profile of the male member upset 190. This shape assists in guidance and centering of the male member 114 through the connector body 112.

The redundant latch/verifier 118 is illustrated in detail in FIGS. 12-15. It includes elements positioned within the bottom slot 166 and also side slots 162 and is demountably coupled to the connector body 112.

It is preferably molded of a resilient, flexible material, such as plastic. The redundant latch/verifier 118 is slidable transversely of the connector body 112 relative to bottom support members 156 toward and away from curved top support member 144 and consequently the primary retainer 116 between a radially inner, or latched, position and a radially outer, or unlatched, position.

The redundant latch/verifier 118 includes a connecting member 224 with a radially inward facing surface 227 from which extend retainer beam 219 and a pair of laterally spaced curved generally resilient fingers 222 extending upward from the connecting member 224 and in the same direction as the retainer beam 219. When assembled to the connector body 112, inwardly facing surface 227 generally overlies bottom slots 166 of connector body 116 with retainer beams 219 slidably disposed in bottom slot 116. Each finger 222 resides in one of the side slots 162.

Each finger 222 includes a knuckle 225 having a laterally inward directed hook 230 with an inwardly facing tip 231. Nesting areas 232, defined by the hooks 230, engage the locking ridges 172 defined by the bottom support members 154 to releasably secure the redundant latch/verifier 118 to the connector body 212 when the redundant latch/verifier is in its outer or unlatched positioned.

Located between the nesting areas 232 of hooks 230 and the connecting member 224, the inner surface of each knuckle 225 defines a transition surface in the form of a ramped surface 234 and a laterally enlarged surface or locking nub 236, and retention areas 237. The distance between the ramped surfaces 234 of the two knuckles 225 is smaller than the distance between the locking ridges 172 of the connector body bottom support members 154. The distance between the laterally enlarged surfaces 236 is less than the spacing between the lateral outer edges of locking ridges 172. The distance between retention areas 237 of the two fingers is approximately equal to the distance between the locking ridges 172.

The retainer beam 219 of the redundant latch/verifier 118 includes a laterally enlarged portion 220 and a narrowed portion 221. The lateral width of the enlarged portion 220 is slightly less than the lateral width of the enlarged portion of the bottom slot 166 between spaced wall surfaces 167 on center support members 150 and spaced wall surfaces 169 on bottom support members 154. The lateral width of the narrowed portion 221 is slightly less than the lateral width of the narrowed portion of bottom slot 166 between laterally spaced walls 175.

As best seen in FIG. 12, the cross-section of the retainer beam 219 is "T" shaped. The narrowed portion 221 forms the leg of the "T" and the enlarged portion 220 forms the top cross bar of the "T." The retainer beam 219 includes an abutment or rearward facing surface 228 on the enlarged portion 220 that faces the planar surface 171 of the bottom protrusion 159. The retainer beam narrowed portion 221 includes a forward facing surface 229 that faces the narrowed portion of the bottom slot 166 defined between lateral surfaces 175. The retainer beam 219 includes lateral side walls of enlarged portion 220 that are closely spaced and slidable relative to wall surfaces 169 of bottom support members 154 and wall surfaces 167 on center support members 150. As best seen in FIG. 15, the narrowed portion 221 of the retainer beam 219 includes lateral side walls that are closely spaced and slidable relative to the lateral walls 175 of the narrowed portion of bottom slot 166 of the connector body 112. The forward facing surface 229 on the narrowed portion 221 of retainer beam 219 includes a chamfer defining by ramp surface 233. When redundant latch/verifier 118 is attached to connector body 112, the ramp surface 233 faces forward toward the male reception end 128 of connector body 118.

In accordance with the present invention, each finger 222 of redundant latch/verifier 118. Further includes an extension beam 240 extending from the end of the knuckle 225 and terminating at a verifying tab 242 formed at its free or distal end. The rearward faces 244 of the extension beams 240 and the verifying tab 242 are planar with the rear surface 248 of the knuckle 225. However, the forward faces 247 of the extension beams 240 and the verifying tabs 242 are spaced axially rearward of the forward face 249 of the knuckle 225, as illustrated in FIGS. 12 and 14, such that the axial thickness of the extension beam 240 and the verifying tab 242 is less than the axial thickness of the knuckle 225. The difference between the thickness of the extension beam 240 and the verifying tab 242 and the thickness of the knuckle 225 is such that it is at least as large as the thickness or axial length of the upset 190.

As best seen in FIG. 15, each verifying tab 242 includes a rounded edge 250, a first sloped edge 252, a second sloped edge 254 and a locking edge 256. The junction of the rounded edge 250 and the first sloped edge 252 forms a point 251. A lead-in ramp surface 260 is formed into the forward face 247 of each verifying tab 242. The lead-in ramp surfaces 260 slopes radially inward and axially rearward from the forward face of each verifying tab 242 and terminate at the first and second sloped edges 252 and 254. The spacing between opposing lead-in ramp surfaces 260 is greatest adjacent the forward faces 247 of the extension beams. The shape and the spacing of the lead-in ramp surfaces 260 match the annular profile of the male member upset 190 allowing the upset 190 to contact the lead-in ramp surface 260 upon insertion of the male member 114 into the connector body 112 when the redundant latch/verifier 118 is in the unlatched position. The spacing between opposing first sloped edges 252 is greater than spacing necessary for the cylindrical sealing surface 194 to be inserted into the connector body 112 without contacting the verifying tab 242 when the redundant latch/verifier 118 is the unlatched position.

A body post edge 258 on the extension beam extends to the locking edge 256. The locking edge 256 and the body post edge 258 define a seat 262 for receiving the central body post 152 when the redundant latch/verifier 118 is in the unlatched position. The rounded edge 250 of the verifying tab 242 is shaped and sized to engage the upper curved surface 153 of the central body post 152 when the redundant latch/verifier is in the latched position.

The assembled quick connector coupling 110 is best seen in FIGS. 1-3. The primary retainer 116 is attached to the connector body 112. The legs 196 of the primary retainer 116 extend through the top slots 158 of the retainer housing section 132. The primary retainer 116 is oriented such that the cross member 198 and the release protrusions 208 are located above the curved upper surface 145 of top support member 144. The lead areas 210 of the legs 196 face the male member reception end 128.

The primary retainer 116 is attached to connector body 112 by insertion of the legs 196 through the top slots 158 by applying a downward or radially inward force on the cross member 198. An increase in downward force is necessary when the legs 196 contact the sides of center support members 150. Applying sufficient downward force, the rounded ends of the legs 196 slide against the sides of the center support members 150, spreading the legs 196 apart and allowing the legs 196 to pass beyond the center support members 150. When the latches 206 on legs 196 clear the center support members 150, the legs 196 spring laterally inward with the latching edges 212 positioned under the locking shoulders 168 of the center supports 150 to releasably lock the primary retainer 116 to connector body 112.

Once the primary latch 116 is assembled onto connector body 112, the cross member 198 resides in the pocket 177 defined by the rearward facing surface 141 of the front rim 140, the forward facing surface 143 of the rear rim 142, and the curved upper surface 145 of the top support member 144. The legs 196 extend into the side slots 162 through the gap between the top support member 144 and the side support members 146, and between the upper body posts 148 and the rearward facing surface 141 of the front rim 140.

As seen in FIG. 1, in the properly attached position, the legs 196 are disposed axially between rearward facing surface 141 of the front rim 140 and the planar surface 171 formed on the bottom protrusion 159. The ramped surfaces 209 of the release protrusions 208 rest on the top curved surfaces 149 of the upper body post 148. If a radially inward pressure is applied to the center of cross member 198 to urge the cross member toward the top support member 144, the ramped surfaces 209 contact and slide or cam against the upper body posts 148 causing the legs 196 to spread apart, with the latches moving transversely outward within side slots 162. This action permits release of the male member 114 should withdrawal of the male member from the connector body 112 if desired.

A properly attached primary retainer 116 is illustrated in FIGS. 1 and 19. In the attached position, the legs 196 of the primary retainer 116 are approximately perpendicular to the axis 124 of the bore 126 when viewed from the side. When viewed from the rear or the front, the legs 196 are approximately equally spaced from the axis 124 of the bore 126.

With the primary retainer 116 properly attached to the connector body 112, the redundant latch/verifier 118 is next mounted to the connector body 112 in its unlatched position by insertion of the fingers 222 in the transversely upward or radially inward direction, through the side slots 162, until the hooks 230 of the knuckles 225 capture the locking ridges 172 of the bottom support members 154 and the body post edges 258 of the fingers 242 are in abutting relationship with the lower curved surfaces 155 of the central body posts 152, as illustrated in FIG. 16. Simultaneously, the retainer beam 219 of the redundant latch/verifier 118 is inserted into the bottom slot 166 of the connector body 112. In the unlatched position, the extension beams 240 and the verifying tabs 242 are positioned axially in between the forward facing surface 143 of the rearward rim 142 and the legs 196 of the primary retainer, as illustrated in FIG. 1. Also in the unlatched position, the upper portion of the knuckle is positioned axially between the forward facing surface 143 of the rear rim 142 and the rearward facing surface 141 of the front rim 140.

In this unlatched position, the redundant latch/verifier 118 is restrained from axially and radially movements relative to the connector body 112. The abutting relationships of the rearward faces 244 of extension beams 240 and 248 of knuckle 225 with the forward facing surface 143 of rearward rim 142 restrain the redundant latch/verifier 118 from rearward axial movement. The abutting relationships of the forward faces 249 of knuckles 225 with the rearward facing surface 141 of forward rim 140 restrain the redundant latch/verifier 118 from forward axial movement.

The extension beams 240 are nested in side slots 162 rearward of the legs 196 of primary retainer 116. Forward faces 247 are closely adjacent rearward faces 204 of legs 196. The engagements of the hooks 230 of fingers 222 with the locking ridges 172 restrain the redundant latch/verifier 118 from radially outward or transversely downward movement. Furthermore, in the unlatched position, the central body posts are situated in the seats 262, defined by the locking edges 256 and the body post edges 258 of the verifying tabs 242, with the catch 157 of the central body post immediately laterally outward of the locking edge 256 of the verifying tab 242. The abutting relationship of the body post edges 258 of the verifying tabs 242 with the lower curved surfaces 155 of the central body posts 152 restrain the redundant latch/verifier 118 from radially inward or transversely upward movement. The abutting relationships of the locking edges 256 of the verifying tabs 242 with the catch 157 prevent the fingers 222 from spreading laterally outward, thus, maintain the abutting relation of the body post edges 258 with the lower curved surfaces 155 even if a significant amount of radially inward or transversely upward force is applied to the redundant latch/verifier 118. In this condition the redundant latch/verifier cannot be moved from the unlatched position.

With redundant latch/verifier 118 attached to the connector body 112 in its unlatched position, the male member 114 may be inserted axially into the connector body 112 to complete a fluid path. As the male member 114 is inserted axially, the end or tip 192 of tube 114 moves rearward and contacts each lead sloping surface 210 defined on legs 196 of primary retainer 116. The sealing surface 194 of the male member 114 passes between legs 196 and into seal chamber 134 with little or no resistance, since the spacing between the legs 196 is approximately equal to the outer diameter of the sealing surface 194 of male member 114.

Resistance to insertion occurs when the upset 190 of the male member 114 contacts the legs 196. The lead areas 210 of the legs 196 permit passage of the upset 190 between the legs 196 only upon applying sufficient axially rearward force. As the upset 190 passes between legs 196, it rides along the lead areas 210 and flexes the legs 196 radially or laterally outward. Once the upset 190 has passed the legs 196 of the primary retainer 116, the upset 190 contacts the lead-in ramp surfaces 260 of the verifying tabs 242 situated immediately axially rearward of the legs 196. The upset engages the lead-in ramp surfaces 260 of the verifying tabs 242 and flexes the fingers 222 of the redundant latch/verifier 118 radially or laterally outward while the legs 196 of the primary retainer 116 spring back into place behind the upset 190 to a locked position.

Since the thickness of the verifying tabs 242 is slightly greater than the axial length of the male member upset 190, the entire length of the upset 190 is able to be located in between the verifying tabs 242 once the fingers 222 of the redundant latch/verifier 118 have flexed radially or laterally outward to accommodate the upset 190.

With the primary retainer 116 in the locked position, the rearward faces 204 of the legs 196 abut the upset abutment surface 191 to prevent withdrawal of the male member 114 from the connector body 112. The spacer sleeve 52, as shown in FIG. 3, prevents further rearward insertion of male member 114 into the connector body 112.

With the legs 196 of the primary retainer 116 in the locked position, the upset 190 flexes the fingers 222 of the redundant latch/verifier 118 laterally outward in side slots 162 to the position illustrated in FIG. 17. Since the verifying tabs 242 are located transversely below the axis 124 of the bore 126, and likewise below the axis of the male member 114; as the male member 114 is inserted rearward into the connector body 112, the lower hemisphere of the upset 190 contacts the lead-in ramp surfaces 260 of the fingers 222. Contacting the lower hemisphere of the upset 190 with the fingers 222 not only applies a rearward directed force on the fingers 222, but it also apply a downwardly directed force on the fingers 222 pushing the redundant latch/verifier 118 transversely downward, or radially outward away from the axis of the male member 114, allowing the locking edges 256 to be located transversely below the catches 157 of the central body posts 152. With the locking edges 256 clear of the catches 157, the fingers 222 are able to spread radially or laterally outward, without interference, to a position in which the second sloped edge 245 is situated immediately below the lower curved surfaces of the central body posts as illustrated in FIG. 17.

It should be noted that the arrangement of the primary retainer 116 and the redundant latch/verifier 118 in this embodiment, namely locating the verifying tab 242 of the redundant latch/verifier 118 immediately axially rearward of the legs 196 of the primary retainer 116, assures that the fingers 222 of the redundant latch/verifier 118 are able spread laterally outward only after the upset 190 has completely passed the legs 196 of the primary retainer 116. In other words, the fingers 222 of the redundant latch/verifier 118 are able to spread outward only after the male member 114 has been fully inserted into the connector body 118 and the legs 196 of the primary retainer 116 is in the locked position.

The connector assembly is completed by positioning the redundant latch/verifier 118 to a latched position. To position the redundant latch/verifier 118 to the latched position, a transversely upward or radially inward force (toward the connector 112) is applied to the connecting member 224. With sufficient transversely upward or radially inward force, the sloped edges 252 and 254 of the verifying tabs 242 slide against the lower curved surfaces 155 of the central body posts 152, further spreading the fingers 222 apart and allowing the points 251 of the verifying tabs 242 to surpass the tips or apexes 163 of the central body posts 152. Once the points 251 of the verifying tabs 242 surpass the tips 163 of the central body posts 152, the fingers 222 snap laterally inward to the latched position in which the rounded edges 250 of the verifying tabs engage the upper curved surfaces 153 of the central body posts as shown in FIGS. 18 and 19. The engagement of the rounded edges 250 with the upper curved surfaces 153 prevents the redundant latch/verifier 118 from being unintentionally moved transversely downward or radially outward from the connector body 112 to the unlatched position.

Furthermore, as the redundant latch/verifier 118 is moved to its latched position transversely toward the primary retainer 116, the locking ridges 172 of the bottom support members 154 are urged out of nesting areas 232 of the fingers 222. Ramped surface 234 ride upon locking ridges 172 and flex the fingers 222 outward causing them to spread apart and permit the enlarged surfaces 236 to pass the locking ridges 172 which then are caused to reside between retention areas 237. The redundant latch/verifier 118 is then also releasably retained in the latched position by the resilient nature of the fingers 222 and the coaction of the retention areas 237 with the locking ridges 172 by the abutting relationship of the laterally enlarged surface 236 with the locking ridges 172. With the redundant latch/verifier 118 in its latched position the hooks 230 at the free ends of fingers 222 are positioned in the side slots 162, laterally outward of the latches 206 at the free ends of legs 196. The distance between the inner surfaces of the hooks 230 on fingers 222 is slightly greater than the distance between the outer surface of the legs 196 of the primary retainer 116 at latches 206. The axial width of the fingers 222 is approximately equal to the axial width of the legs 196. Notably, the length of the fingers 222 is such that when the redundant latch/verifier 118 is in the latched position, the fingers 222 interfere with outward flexing of the legs 196 thus assuring that the fingers 196 remain locked to locking shoulders 168 of center support member 150.

At the same time, the retainer beam 219 is moved transversely upward or radially inward toward the male member 114. In the latched position, the rearward facing surface 228 of the retainer beam 219 is in axial abutting relationship with the abutting surface 191 of upset 190 of the male member 114. This axial abutting relationship between the retainer beam 219 and the upset 190 also prevents the male member 114 from moving axially outward of the tube reception end 128 and provides the redundant latch feature to retain the male member 114 in the connector body 112. Hence, the redundant latch/verifier 118 is able to independently retain the male member 114 of the tube in the connector body 112 should the primary retainer 116 fail.

As discussed previously, with the redundant latch/verifier 118 in the unlatched position, the fingers 222 of the redundant latch/verifier 118 are able spread transversely outward only after the male member 114 has been fully inserted into the connector body 118. Hence, for the redundant latch/verifier 118 to be positioned in the latched position, by applying a transversely upward or radially inward force to the connecting member 224 when the locking edges 256 are clear of the catches 157, likewise requires the male member 114 to have been fully inserted into the connector body 118. Therefore, the redundant latch/verifier 118 in the latched position provides a visual verification that the male member 114 has been fully inserted into the connector body 118.

The redundant latch/verifier 118 may be intentionally dislodged and moved to its unlatched position, by forcing the redundant latch/verifier 118 downward or radially outward from the connector body 212, for example by inserting a screwdriver blade into the notch 147 to prying the connecting member 224 of the redundant latch/verifier 118 radially outward or transversely downward from the connector body 212.

With the redundant latch/verifier 118 positioned in the unlatched position; release of the male member 114 from a locked position behind legs 196 can be achieved by exerting a transversely downward or radially inward force on the cross member 198 of the primary retainer 116. Radially inward force on the cross member 198 causes the ramped surfaces 209 on release protrusions 208 to contact the curved upper surface 145 of the top support member 144 of connector body 112. The ramped surfaces 209 of the release protrusions 208 slide or cam against the top support member 144, causing the legs 196 of the primary retainer 116 to spread laterally apart as application of downward force continues. Eventually, the legs 196 will be spread apart to a released position in which the distance between them is sufficient to allow removal of the upset 190. The male member 114 may thus be withdrawn from the connector body 112. Upon withdrawal of the member 114 from the connector body 112 and relaxation of primary retainer 116, the primary retainer 116 returns to its normal installed position with the cross members 198 urged upwardly by coaction of the angled surfaces 205 against center support members 150.

A somewhat modified forms of quick connector coupling assembly 310, embodying the features of the present invention, is illustrated in FIGS. 20-29. Similar to the quick connector coupling assembly 110, the alternative quick connector coupling assembly 310 is comprised of a generally cylindrical female connector body 312 and a male member 114 secured together by a primary retainer member 116 and a separate redundant latch/verifier member 318. The male member 114 and the primary retainer 116 of the alternative quick connector coupling assembly 310 are the same as the male member 114 and the primary retainer 116 of the quick connector coupling assembly 110, previously discussed in detail.

The connector body 312 of the alternative quick connector coupling assembly 310 is illustrated in detail in FIGS. 21-24. The connector body 312 is similar to the connector body 112 of the quick connector coupling assembly 110 with the exception that the connector body 312 includes a pair of locking pads to prevent the legs 196 of the primary retainers 116 from spreading laterally outward should the male member 114 be pulled in the forward direction and a twisting or rotational motion be exerted on the male member 114.

The connector body 312 is defined by a generally cylindrical, stepped radial outer wall 320. The interior surface of wall 320 defines a through bore 326 centered about a longitudinal axis 324. The bore 326 of the connector body 312 extends completely through the connector body 312, from a larger diameter reception end 328 to a smaller diameter, hose connection end 330. Variations in the diameter of the wall 320 divide the bore 326 into distinct sections. Moving axially rearward from the male member reception end 328 to the hose connector end 330, they are: retainer housing section 332, seal chamber, tube end receptacle, and fluid passageway. The configurations of the seal chamber, the tube end receptacle, and the fluid passageway of the quick connector coupling assembly 310 are the same as the seal chamber 134, the tube end receptacle 136, and the fluid passageway 138 of the quick connector coupling assembly 110, previously discussed in detail.

The retainer housing section 332 is adjacent to the male member reception end 328. It is defined by a front rim 340 having a transverse planar forward facing surface 329 that defines the entrance 327 to through bore 326 at the male reception end 328. Front rim 340 is spaced from a rear rim 342 separated by a gap or space 339 open to through bore 326. These surfaces 341,343 are connected by an arcuate top support member 344, two side support members 346, two center support members 350, and two bottom support members 354. A notch 347 is defined at the bottom of the rear rim 342. The upper curved surface of top support member 344 is somewhat recessed radially inward from the radially outward most edge of the rear rim 342. The top support member 344 and the surfaces 341,343 define a pocket 377 that receives a cross member of the primary retainer 116.

The spaces 339 between the top support member 344 and the two side support members 346 define a pair of first or top slots 358. The space 339 between the two center support members 350 and the two bottom support members 354 defines a second or bottom slot 366 directly opposite from top support member 344. The spaces 339 between the two side support members 346 and bottom support members 354 define a pair of third or side slots 362. The slots 358, 362, and 366 are open to the through bore 326.

The top slots 358 receive and position the legs of the primary retainer 116 transversely to the central axis 324 of the connector body 312. The bottom slot 366 receives and positions a beam of the redundant latch/verifier 318 transversely to central axis 324 of the connector body. Elements of both the primary retainer 116 and redundant latch/verifier 318 reside in side slots 362.

Figure 20:
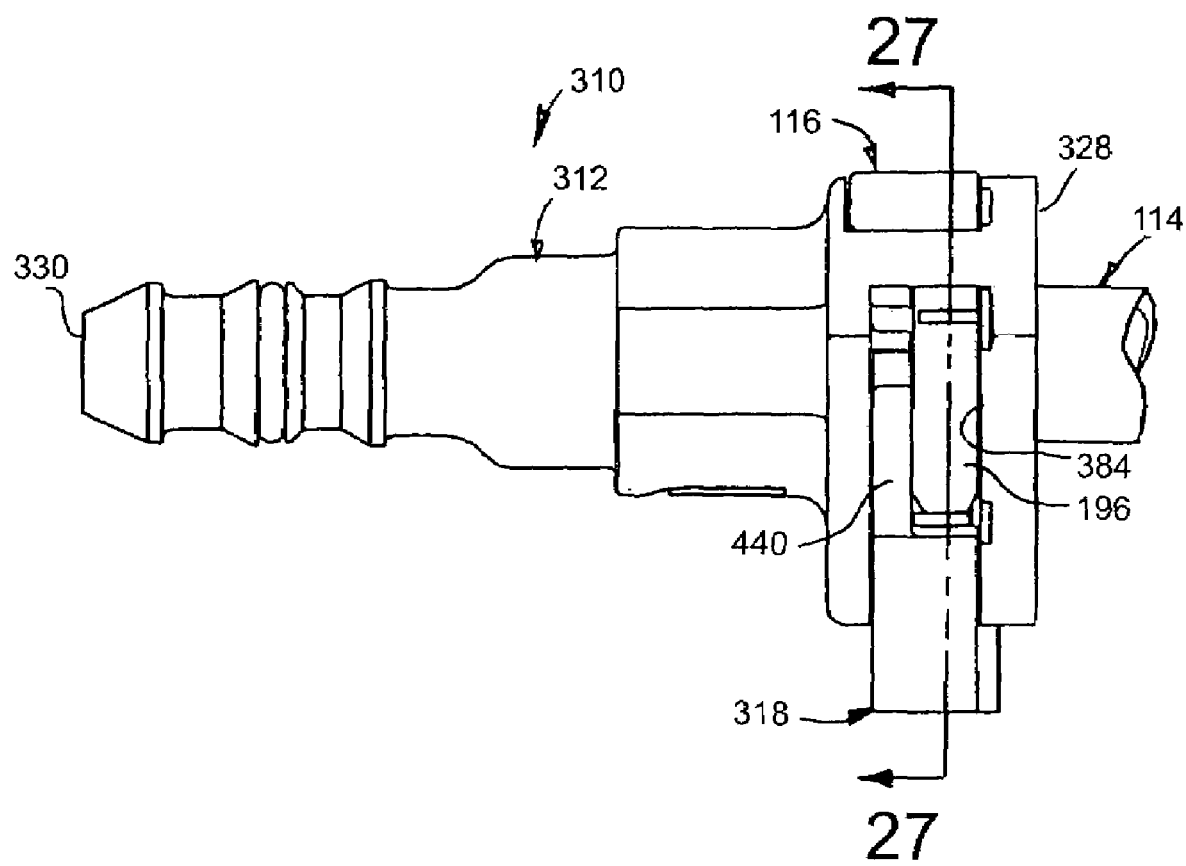
FIG. 20 is a side view of a modified or alternative quick connector coupling assembly embodying the features of the present invention.
Figure 21:
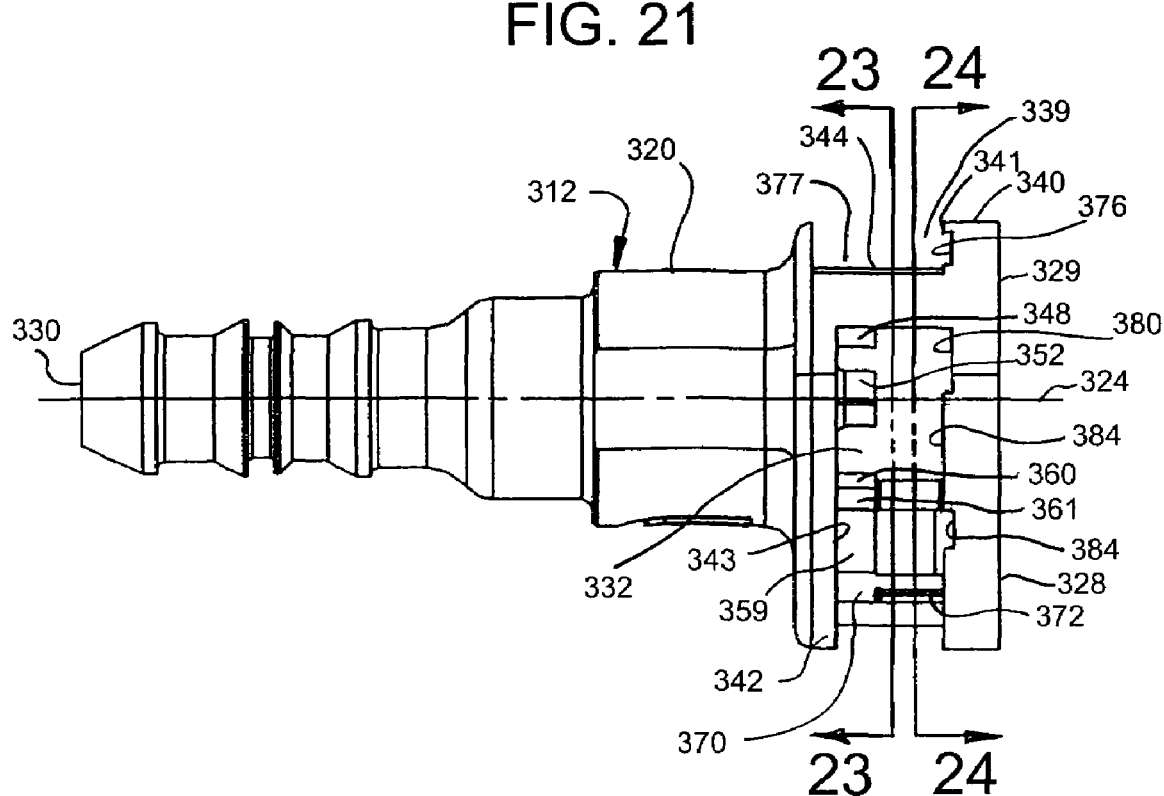
FIG. 21 is a side view of the female connector body of the alternative quick connector coupling assembly of FIG. 20.

As best seen in FIGS. 20-21, the connector body 312 includes a series of axial protrusions or body posts extending forward from the forward facing surface 343 of the rear rim 342, partially filling the spaces 339 between the rims 340,342. These protrusions or body posts are integrally molded into the connector body. A pair of first or upper body posts 348 are disposed at the lateral ends of curved top wall 344. These upper body posts 348 each include a top curved surface 349. An inner curved surface 351 extends under the upper body posts 348 and the top support member 344. The upper body posts 348 include forward facing surfaces 337, best seen in FIG. 21 that face the rearward facing surface 341 of the front rim 340.

A pair of second or central parabolic shaped body posts 352 are disposed laterally on either side of through bore 326 at approximately 180° (degrees) apart, with the tip or apex 363 of the parabolic shaped central body post 352 pointing radially outward. Each central body post 352 includes an upper curved surface 353 and a lower curved surface 355 which join at the apex 363 that resides in a plane that raises through center line 324. Each central body post 352 further includes a radially inward curved surface 356 that is formed on the same radius of curvature as the radially inner curved surface 351 of first body posts 348 and top support member 344. Inner curved surface 356 intersects the lower curved surface 355 at catch 357.

Figure 29:
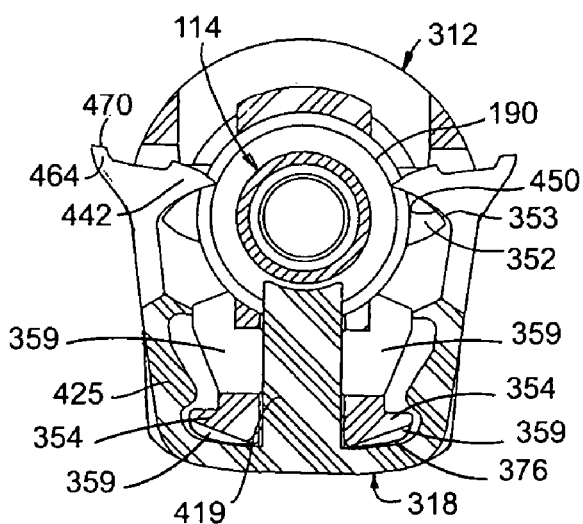
FIG. 29 is a sectional front view similar to FIG. 27, showing the male member fully inserted into the connector body and the redundant latch/verifier in its latched position.

A third or bottom protrusion or plateau 359 is a solid portion of the body 312 that extends between center support members 350 and the bottom support members 354. The bottom protrusion 359 is similar to the bottom protrusion 159 of connector body 112 with the exception that the bottom edges 376 of the bottom protrusion 359 is contoured to match the contour of the retention areas 437 of the redundant latch/verifier 318 when the redundant latch/verifier 318 is in the latched position as shown in FIG. 29. This allows the locking ridges 374 to better retain the redundant latch/verifier 318 in its latched position when the locking ridges 172 reside between the retention areas 437. The bottom protrusion 359 defines a planar surface 371, best seen in FIG. 23, that faces forward towards the rearward facing surface 341 of the front rim 340. The bottom protrusion 359 includes spaced ledges 360 extending transversely outward from center support members 350 at an angle downward in the direction toward the bottom support members 354. The radial outward extent of bottom protrusion 359 is defined by spaced side walls 361 that are parallel for a short distance and then converge toward the bottom support members 354.

The bottom protrusion 359 further includes radially inner curved surface 364 on the same radius of curvature as the radially inner curved surface 351 defined by upper body posts 348 and curved top support member 344 and the inner curved surfaces 356 of central body posts 352. These inner curved surfaces 351,356,364 define an upset receiving pocket 365.

Figure 24:
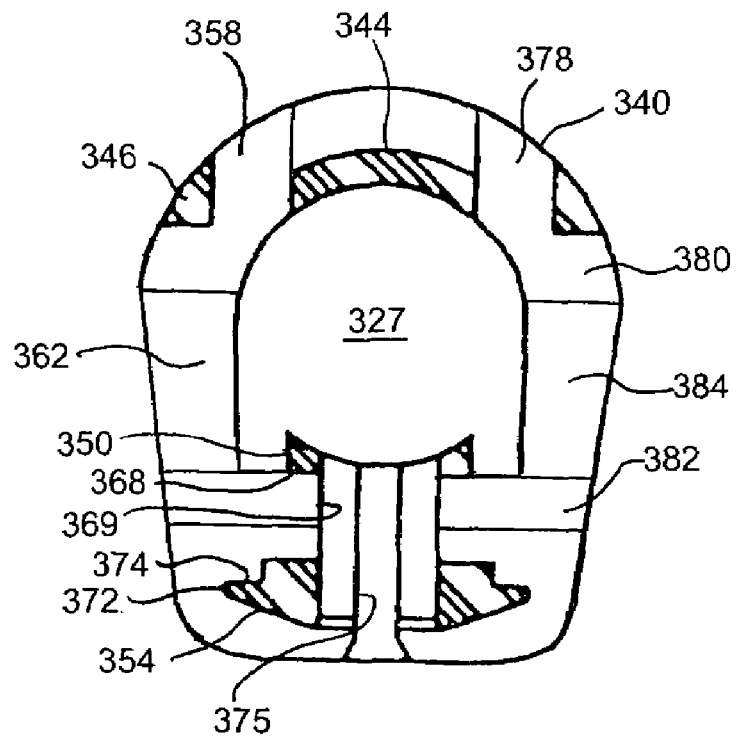
FIG. 24 is a sectional rear view of the connector body of FIG. 21, taken along line 24-24 of FIG. 21.

As illustrated in FIG. 24, the rearward facing surface 341 of the front rim 340 defines a plurality of channels recessed from the rearward facing surface. A pair of first or top channels 378 are formed in between the side support members 346 and the top support member 344. The top channels 378 extend transversely from the top edge of the front rim 340 to the opening of the front rim 340 defining the entrance 327. A pair of second or upper side channels 380 are formed below the side support members. The upper side channels 380 extend laterally from laterally outer edges of the front rim 340 to the opening defining the entrance 327. A third of bottom side pairs of channels 382 are formed on the front rim 340, a distance below the top side channels 380. A radially inward extending locking pad 384 is formed between each of the upper side channel 380 and the lower side channel 382.

The upper side channels 380, the lower side channels 382, and the locking pads 384 are located and sized such that if the male member 114 is pulled in the axially forward direction, after the male member has been fully inserted into the connector body 312; the legs 196 of the primary retainer 116 will be forced axially forward to approximately the axial plane of the upper side channels 380 and the lower side channels 382. At this axial position, the legs 196 of the primary retainer 116 are located radially or laterally inward of the locking pads 384. Should the male member be twisted or rotated when the primary retainer 116 is at this axially forward position, the locking pads 384 prevent the legs 196 from unintentionally spreading apart to an unlocked position.

Figure 22:
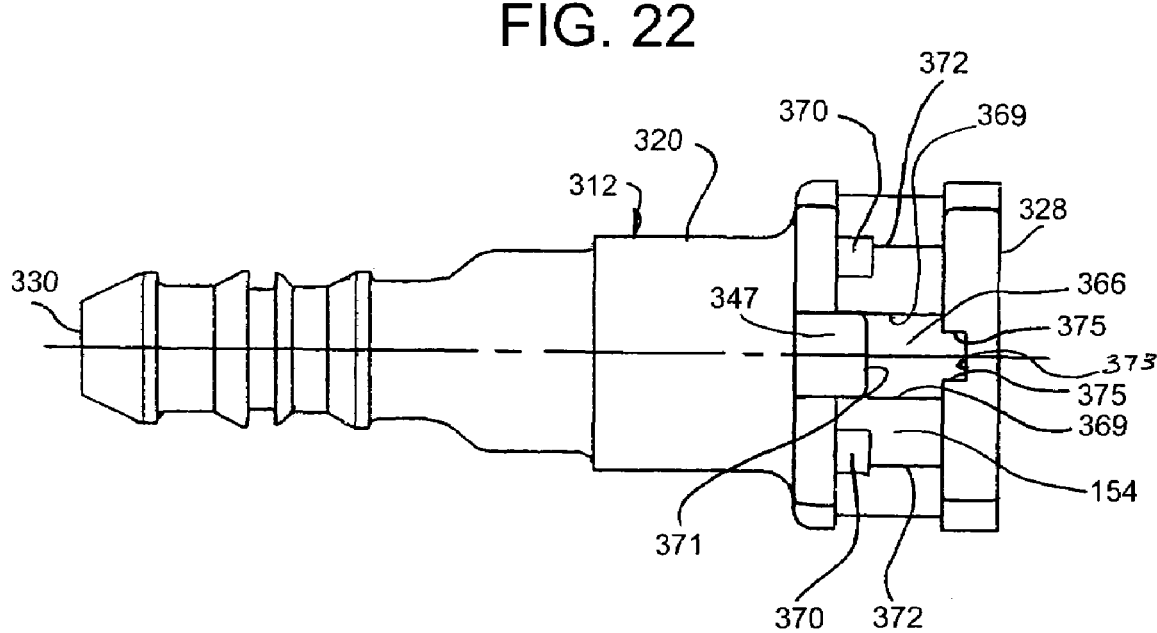
FIG. 22 is a bottom view of the connector body of FIG. 21.
Figure 23:
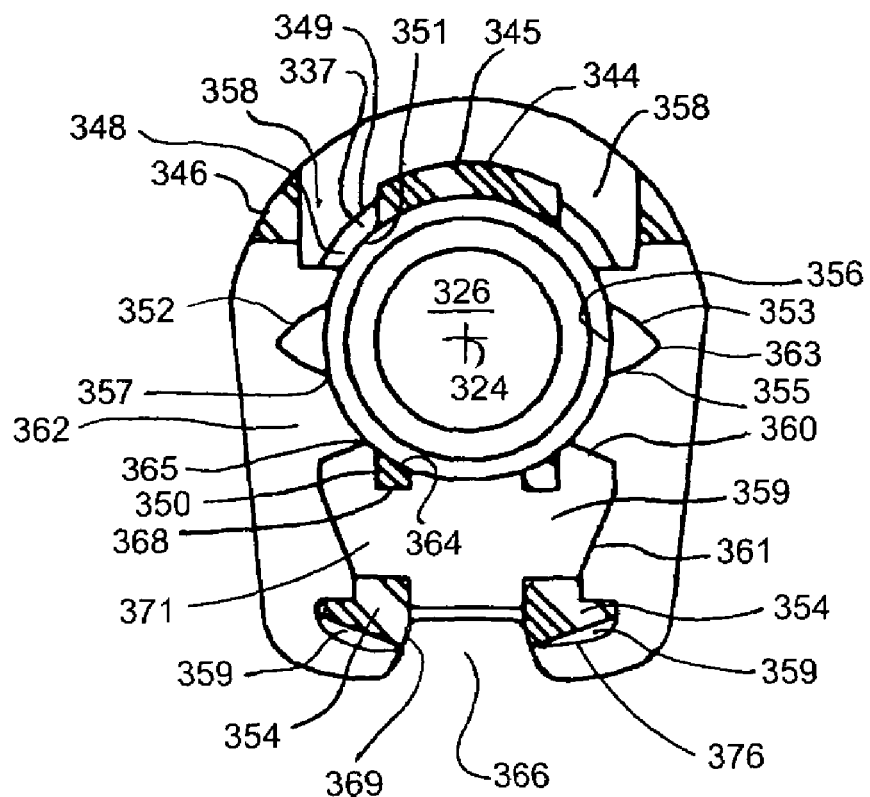
FIG. 23 is a sectional front view of the connector body of FIG. 21, taken along line 23-23 of FIG. 21.

The bottom slot 366 includes an enlarged portion that extends laterally between spaced inward facing surfaces 367 of center support members 350 and spaced inward facing surfaces 369 of bottom support members 354, best seen in FIGS. 22 and 23, and a narrowed portion, best seen in FIGS. 22 and 24 that extends transversely between lateral surfaces 375. The lateral surfaces 375 are parallel to each other and to surfaces 369 and extend to internal bore 326. The cross section of the bottom slot 366 is generally "T" shaped. The planar surface 371 of the bottom protrusion 359 defines the rearward most surface of the bottom slot 366. A forward most surface 373 defines the front of the bottom slot 366 as seen in FIG. 22.

Each of the center support members 350 defines a locking shoulder 368, best seen in FIG. 23. A locking ridge 372 extends laterally from the outer edge of each bottom support member 354 and defines a flat 374, best seen in FIGS. 23 and 24. As illustrated in FIG. 21, the locking ridge 372 extends axially from the rearward facing surface 341 of the front rim 340 to a distance before the forward facing surface 343 of the rear rim 342; hence, defining a groove 370 between the rearward terminal end of the locking ridge and the forward facing surface 343 of the rear rim 342. The groove 370 has an axial length slightly larger than the thickness of the extension beam and the verifying tab of the redundant latch/verifier 318 allowing the groove 370 to receive the extension beam and the verifying tab while the redundant latch/verifier 318 is positioned to its unlatched position on the connector body 312.

Figure 25:
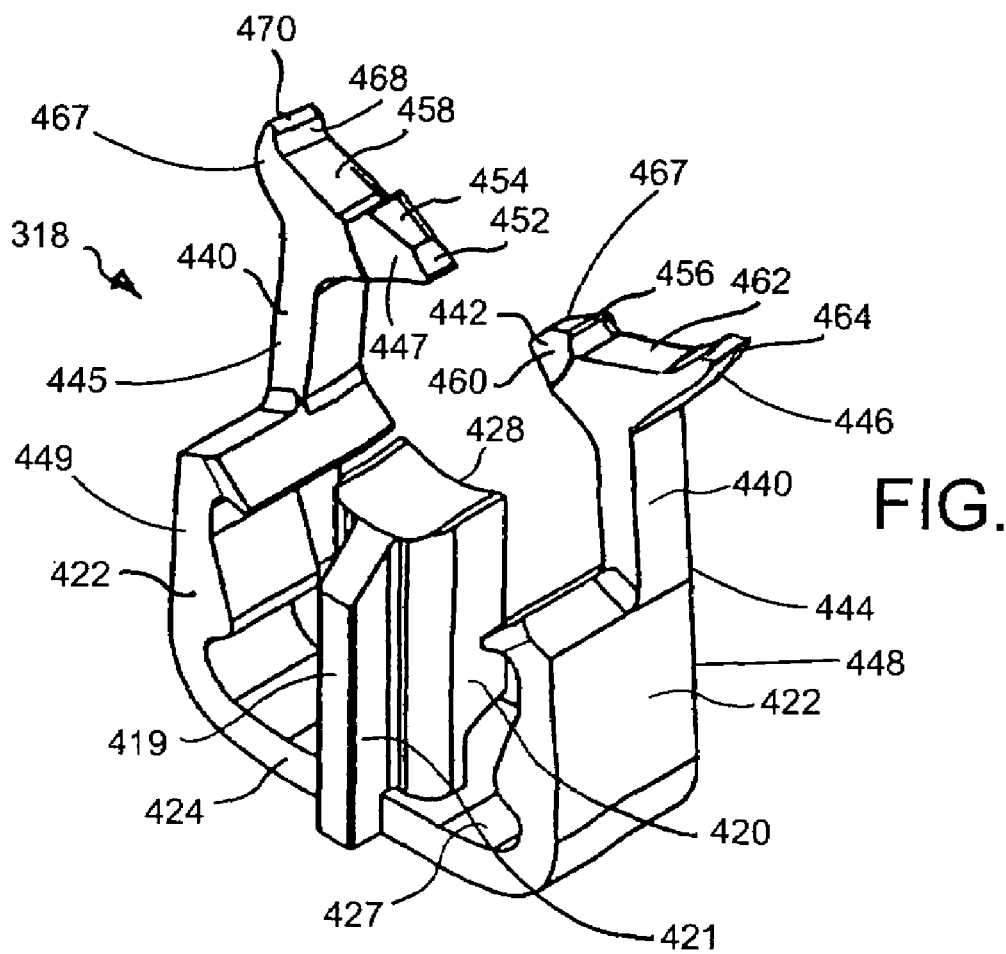
FIG. 25 is a perspective view of the redundant latch/verifier of the alternative quick connector coupling assembly of FIG. 20.
Figure 26:
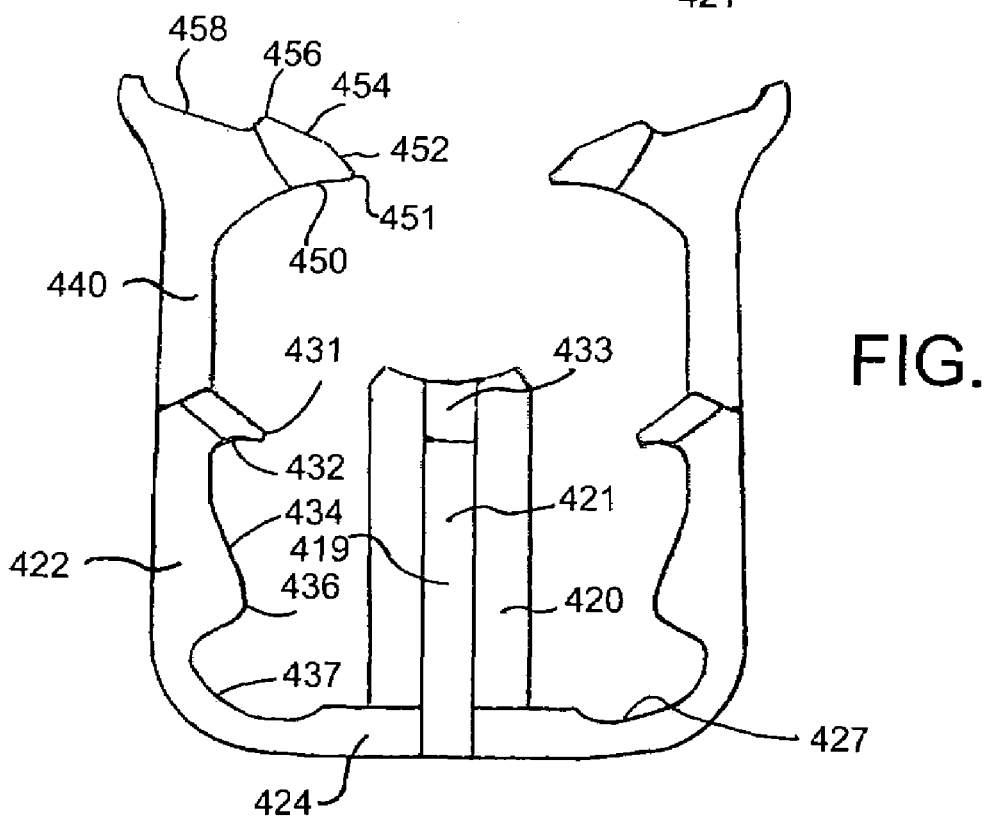
FIG. 26 is a front view of the redundant latch/verifier of FIG. 25.

The redundant latch/verifier 318 of the alternative quick connector coupling assembly 310 is illustrated in detail in FIGS. 25-26. The redundant latch/verifier 318 is similar to the redundant latch/verifier 318 of the quick connector coupling assembly 110 with the exception that each finger of the redundant latch/verifier 318 includes a transversely extending release tab.

The redundant latch/verifier 318 extends into the bottom slot 366 and also side slots 362 of the connector body 312 and is demountably coupled to the connector body 312. It is slidable transversely of the connector body 312 relative to bottom support members 356 toward and away from curved top support member 344 and consequently the primary retainer 116 between a radially inner, or latched, position and a radially outer, or unlatched, position. It is preferably molded of a resilient, flexible material, such as plastic.

The redundant latch/verifier 318 includes a connecting member 424 with a radially inward facing surface 427 overlying the bottom slot 366 when the redundant latch/verifier 318 is in its latched position, and from which extends retainer beam 419 slidably disposed in the bottom slot 366 of the connector body. Redundant latch/verifier 318 also includes laterally spaced portions in the form of a pair of curved generally resilient fingers 422 extending transversely upward from connecting member 324 and in the same direction as the retainer beam 419.

Each finger 422 includes a knuckle 425 having a laterally inward directed hook 430 with an inwardly facing tip 431. Nesting areas 432, defined by the hooks 430, engage the locking ridges 372 defined by the bottom support members 354 to releasably secure the redundant latch/verifier 318 to the connector body 312 when the redundant latch/verifier is in its outer, or unlatched, positioned.

Located between the nesting areas 432 of hooks 430 and the connecting member 424, the inner surface of each knuckle 425 defines a transition surface in the form of a ramped surface 434 and a laterally enlarged surface or locking nub 436, and retention areas 437. The distance between the ramped surfaces 434 of the two knuckles 425 is smaller than the distance between the locking ridges 372 of the connector body bottom support members 354. The distance between the locking nubs 436 is less than the spacing between the lateral outer edges of locking ridges 372. The distance between the retention areas 437 of the two fingers is approximately equal to the distance between the locking ridges 372.

Each finger further includes an extension beam 440 extending from the end of the knuckle 425 and terminating at a transversely inward extending verifying tab 442 and a transversely outward extending release tab 464 formed at an end remote from the connecting member 424. The rearward faces 444, 446, 466 of the extension beam 440, the verifying tab 442, and the release tab 464 are in-line with the rearward face 448 of the knuckle 425. However, the forward faces 445, 447, 467 of the extension beam 440, the verifying tab 442, and the release tab 464 are recessed from the forward face 449 of the knuckle 425, as illustrated in FIG. 25, such that the thickness of the extension beam 440, the verifying tab 442, and the release tab 464 is less than the thickness of the knuckle 425. The difference between the thickness of the extension beam 440, the verifying tab 442, and the release tab 464 and the thickness of the knuckle 425 should be at least as large as the thickness or axial length of the upset 190.

Each verifying tab 442 includes a rounded edge 450, a first sloped edge 452, a second sloped edge 454, and an inner locking edge 456. The junction of the rounded edge 450 and the first sloped edge 452 forms a point 451. A lead-in ramp surface 460 is formed into the forward face 447 of each verifying tab 442. The lead-in ramp surfaces 460 slope radially inward and axially rearward from the forward face 447 of each verifying tab 442 and terminate at the first and second sloped edges 452, 454. The spacing between opposing lead-in ramp surfaces 460 is greatest adjacent the forward faces 447. The shape and the spacing of the lead-in ramp surfaces match the annular profile of the male member upset 190 allowing the upset 190 to contact the lead-in ramp surface 460 upon the male member 114 being inserted into the connector body 312 when the redundant latch/verifier 318 is in the unlatched position. The spacing between opposing first sloped edges 452 is greater than spacing necessary for the male member cylindrical sealing surface 194 to be inserted into the connector body 312 without contacting the verifying tab 442 when the redundant latch/verifier 318 is the unlatched position. The rounded edge 450 of the verifying tab 442 is shaped and sized to engage the upper curved surface 353 of the central body post 352 when the redundant latch/verifier 318 is in the latched position.

The release tab 464 extends transversely outward, opposite the verifying tab. The release tab 464 includes an outer locking edge 468 terminating at an upwardly extending protrusion 470 at one end of the outer locking edge. A body post edge 458 extends from the other end of the outer locking edge 468 to the inner locking edge 456 of the verifying tab 442. The inner locking edge 456, the body post edge 258, and the outer locking edge 468 define a seat 462 for receiving the central body post 452 when the redundant latch/verifier 318 is in the unlatched position.

The retainer beam 419 of the redundant latch/verifier 318 includes a laterally enlarged portion 420 and a narrowed portion 421. The lateral width of the enlarged portion 420 is slightly less than the lateral width of the enlarged portion of the bottom slot 366 between spaced wall surfaces 367 on center support members 350 and spaced wall surfaces 369 on bottom support members 354. The lateral width of the narrowed portion 421 is slightly less than the lateral width of the narrowed portion of bottom slot 366 between laterally spaced walls 375.

As best seen in FIG. 25, the cross-section of the retainer beam 419 is "T" shaped. The narrowed portion 421 forms the leg of the "T" and the enlarged portion 420 forms the top cross bar of the "T." The retainer beam 419 includes an abutment or rearward facing surface 428 on the enlarged portion 420 that faces the planar surface 471 of the bottom protrusion 459. The retainer beam narrowed portion 421 includes a forward facing surface 429 that faces the narrowed portion of the bottom slot 366 defined between lateral surfaces 375. The retainer beam 419 includes lateral side walls of enlarged portion 420 that are closely spaced and slidable relative to wall surfaces 369 of bottom support members 354 and wall surfaces 367 on center support members 350. As best seen in FIG. 25, the narrowed portion 421 of the retainer beam 419 includes lateral side walls that are closely spaced and slidable relative to the lateral walls 375 of the narrowed portion of bottom slot 366 of the connector body 312. The forward facing surface 429 on the narrowed portion 421 of retainer beam 419 includes a chamfer defining by ramp surface 433. When redundant latch/verifier 318 is attached to connector body 312, the ramp surface 433 faces toward the male reception end 328 of connector body 318.

The assembled alternative quick connector coupling 310 is illustrated in FIG. 20. The primary retainer 116 is attached to the connector body 312 in the same manner as the primary retainer 116 is attached to the connector 112 of the quick connector coupling 110, previously described in detail.

Figure 27:
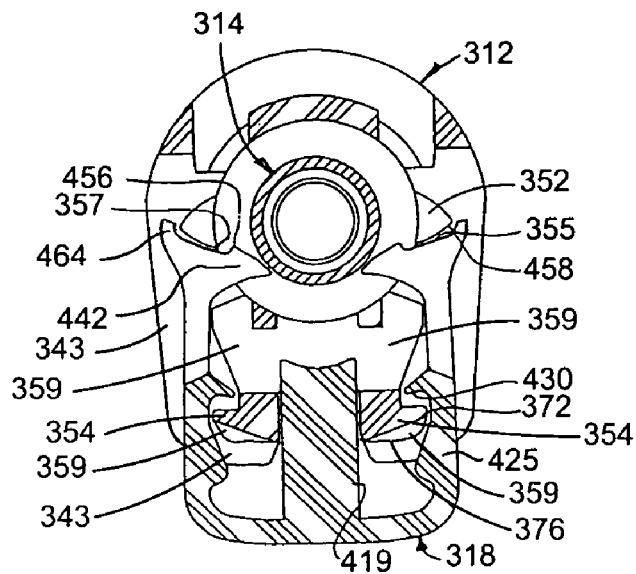
FIG. 27 is a sectional front view of the quick connector coupling of FIG. 20 taken along line 27-27 of FIG. 20, with the primary retainer removed for clarity, showing the redundant latch/verifier in its unlatched position.
Figure 28:
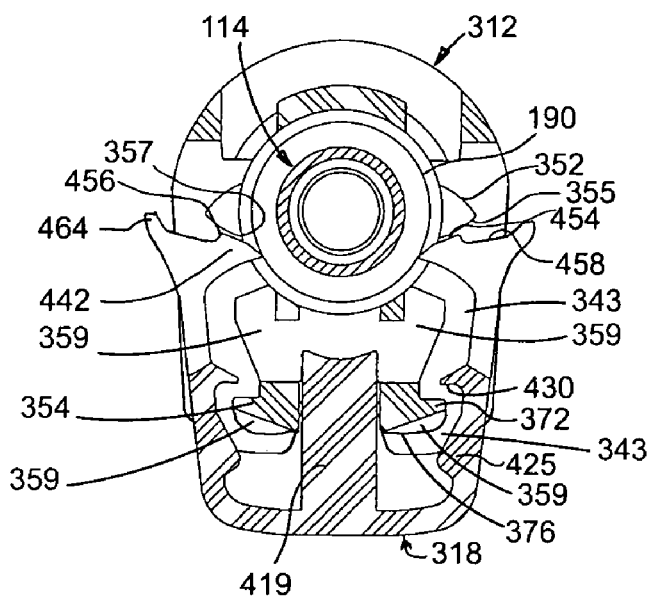
FIG. 28 is a sectional front view similar to FIG. 27, showing the male member fully inserted into the connector body and the redundant latch verifier in an intermediate position between its unlatched position and its latched position.

With the primary retainer 116 properly attached to the connector body 312, the redundant latch/verifier 318 is next mounted to the connector body 312 to its unlatched position in a similar manner as the redundant latch/verifier 118 is mounted to the connector body 112 of the quick connector coupling 110 to its unlatched position described in detail above. The redundant latch/verifier is positioned to its unlatched position by sliding the fingers 422 in the transversely upward or radially inward direction, along the grooves 370 of the bottom support members 354 and through the side slots 362, until the hooks 430 of the knuckles 425 capture the locking ridges 372 of the bottom support members 354 and the body post edges 458 are in abutting relationship with the lower curved surface 355 of the central body post 352, as illustrated in FIG. 27. Simultaneously, the retainer beam 419 of the redundant latch/verifier 318 is inserted into the bottom slot 366 of the connector body. In the unlatched position, the extension beams 440 and the verifying tabs 442 are positioned axially in between the forward facing surface 343 of the rear rim 342 and the legs 196 of the primary retainer, as illustrated in FIG. 20. Also in the unlatched position, the upper portion of the knuckle 425 is positioned axially in between the forward facing surface 343 of the rear rim 342 and the rearward facing surface 341 of the front rim 340.

With redundant latch/verifier 318 attached to the connector body 312 in its unlatched position, the male member 114 of the quick connector coupling 310 may be inserted into the connector body 312 to complete a fluid path in the same manner the male member 114 is inserted into the connector body 112 of the quick connector coupling 110, previously described in detail. Upon the male member 114 fully inserted into the connector body 312, the fingers 442 move transversely downward and laterally outward from the position illustrated in FIG. 27 to the position illustrated in FIG. 28 in which the inner locking edges 456 are clear of the catches 357. The movement of the fingers 442 transversely downward and laterally outward is in the same manner as the movement of the fingers 142 of the redundant latch/verifier 118, previously described in detail.

As with the arrangement of the primary retainer 116 and the redundant latch/verify 118 of the quick connector coupling 110, the arrangement of the primary retainer 116 and the redundant latch/verifier 318 of the alternative quick connector coupling 310, namely locating the verifying tab 442 of the redundant latch/verifier 318 immediately axially rearward of the legs 196 of the primary retainer 116, assures that the fingers 422 of the redundant latch/verifier 318 are only able spread outward after the upset 190 has completely passed the legs 196 of the primary retainer 116.

The connector assembly is completed by positioning the redundant latch/verifier 318 to a latched position. To position the redundant latch/verifier 318 to the latched position, a transversely upward or radially inward force (toward the connector body 312) is applied to the connecting member 424. With sufficient upward or radially inward force, the sloped edges 452 and 454 of the verifying tabs 442 slide against the lower curved surfaces 355 of the central body posts 152, further spreading the fingers 422 apart and allowing the points 451 of the verifying tabs 442 to surpass the tips or apexes 363 of the central body posts 352. Once the points 451 of the verifying tabs 442 surpass the tips of the central body posts 152, the fingers snap laterally inward to the latched position in which the rounded edges 450 of the verifying tabs engage the upper curved surfaces 353 of the central body posts as shown in FIG. 29. Also in the latched position, the release tabs 464 extend laterally outward through the side slots 368 allowing easy access to the protrusion 470 of the release tabs.

Furthermore, as the redundant latch/verifier 318 is moved to its latched position transversely toward the primary retainer 116, the locking ridges 372 of the bottom support members 354 are urged out of nesting areas 432 of the fingers 422. Ramped surface 434 ride upon locking ridges 372 and flex the fingers 422 outward causing them to spread apart and permit the locking nubs 436 to pass the locking ridges 372 which then are caused to reside between retention areas 437. The redundant latch/verifier 318 is then also releasably retained in the latched position by the resilient nature of the fingers 422 and the coaction of the retention areas 437 with the locking ridges 372 by the abutting relationship of the locking nubs 436 with the locking ridges 372. With the redundant latch/verifier 318 in its latched position the hooks 430 at the free ends of fingers 422 are positioned in the side slots 362, laterally outward of the latches 406 at the free ends of legs 196. The distance between the inner surfaces of the hooks 430 on fingers 422 is slightly greater than the distance between the outer surface of the legs 196 of the primary retainer 116 at latches 206. The axial width of the fingers 422 is approximately equal to the axial width of the legs 196. Notably, the length of the fingers 422 is such that when the redundant latch/verifier 318 is in the latched position, the fingers 422 interfere with outward flexing of the legs 196 thus assuring that the fingers 196 remain locked to locking shoulders 368 of center support member 350.

At the same time, the retainer beam 419 is moved transversely upward or radially inward toward the male member 114 so that the rearward facing surface 428 of the retainer beam 419 is in axial abutting relationship with the abutting surface 191 of upset 190 of the male member 114 upon the redundant latch/verifier in the latched position. As with the redundant latch/verifier 118 of the quick connector coupling 110, the redundant latch/verifier 318 can be positioned in the latched position after the male member has been fully inserted into the connector body 318.

As with the redundant latch verifier/verifier 118, the redundant latch/verifier 318 may be intentionally dislodged and moved to its unlatched position, by forcing the redundant latch/verifier 318 transversely downward or radially outward from the connector body 312 by using a screwdriver blade to pry the connecting member 424 radially outward from the connector body 312. Alternatively the redundant latch/verifier 318 may be intentionally dislodge and moved to its unlatched position by simply pulling the protrusions 470 of the release tabs 464, extending through the side slots 362, transversely downward. By pulling the protrusions 470 downward, the rounded edges 450 of the verifying tabs 442 cam against the upper curved surfaces 353 of the central body posts 352 spreading the fingers 422 laterally outward. Once the points 451 of the verifying tabs 442 surpass the tips 363 of the central body post 352, the fingers 442 snap inward to the unlatched position.

Various features of the present invention have been explained with reference to the embodiments shown and described. It must be understood that numerous modifications may be made without departing from the spirit and scope of the invention as defined by the appended claims.

The invention claimed is:

1. A quick connector coupling for forming a severable connection in a fluid line comprising:

a connector body defining a through bore extending axially rearward from a male reception end of said connector body;

a male member extending through said male reception end of connector body and into said bore, said male member having a generally cylindrical sealing surface and an annular upset, said upset having a diameter greater than the diameter of said tubular surface;

a primary retainer to releasably secure said male member within said connector body and including spaced apart legs movable between a locked position and a released position in which the spacing between said legs is increased;

a separate redundant latch/verifier releasably coupled to said connector body and including spaced apart fingers each having a verifying tab, said redundant latch/verifier is movable relative to said connector body toward and away from said primary retainer between an unlatched position and a latched position only if said upset of said male member is in contact with said verifying tabs.

2. The quick connector coupling as claimed in claim 1 wherein said redundant latch is movable between said unlatched position and said latched position only if said annular upset of said male member is located in between said verifying tabs.

3. The quick connector coupling as claimed in claim 1 wherein said verifying tabs of said redundant latch/verifier are located axially rearward of said legs of said primary retainer relative to said male member reception end of said connector body.

4. The quick connector coupling as claimed in claim 1 wherein said redundant latch/verifier includes a connecting member and each said finger includes a knuckle intermediate said verifying tab and said connecting member, said fingers further include extension beams connecting said verifying tabs to said knuckles, said extension beams are located axially rearward of said legs of said primary retainer relative to said male member reception end of said connector body.

5. The quick connector coupling as claimed in claim 1 wherein each of said verifying tabs includes a lead-in ramp surface facing toward said male member reception end of said connector body.

6. The quick connector coupling as claimed in claim 1 wherein each of said fingers has a seat defined at the end of each finger and wherein said connector body further includes an axially extending body post disposed in said seat if said upset of said male member is spaced from said verifying tabs.

7. The quick connector coupling as claimed in claim 6 wherein said body post is situated in said seat if said upset is in contact with said generally cylindrical sealing surface of said male member.

8. The quick connector coupling as claimed in claim 6 wherein said body post is spaced from said seat if said upset is in contact with said verifying tab.

9. The quick connector coupling as claimed in claim 6 wherein each of said fingers includes a locking edge and a body post edge defining said seat.

10. The quick connector coupling as claimed in claim 6 wherein each of said fingers includes an inner locking edge, a body post edge and an outer locking edge defining said seat.

11. The quick connector coupling as claimed in claim 10 wherein each of said fingers of said redundant latch/verifier includes a release tab extending laterally outward.

12. The quick connector coupling as claimed in claim 1 wherein each of said fingers of said redundant latch/verifier includes a release tab extending laterally outward.

13. The quick connector coupling as claimed in claim 1 wherein said latch/verifier includes a retainer beam slidable in a slot defined in said body.

14. The quick connector coupling as claimed in claim 13 wherein said retainer beam is of a length such that it is exposed in said through bore when said redundant latch/verifier is in said latched position.

15. The quick connector coupling as claimed in claim 13 wherein said retainer beam includes a surface in axial abutting relationship with said upset of said male member when the male member is frilly inserted into the connector body.

16. The quick connector coupling as claimed in claim 13 wherein said slot is "T" shaped in cross section and said retainer beam of said redundant latch/verifier is "T" shaped in cross section, said retainer beam being slidably supported in said slot.

17. The quick connector coupling as claimed in claim 13 wherein said retainer beam extends from a connection member and said fingers extends from said connection member in the same direction as said retainer beam.

18. The quick connector coupling as claimed in claim 1 wherein said legs are connected by a cross member and are movable laterally between said locked and released positions by pressing said cross member toward said connector body.

19. The quick connector coupling as claimed in claim 1 wherein said connector body includes a top support member, a pair of side support members spaced therefrom and defining a pair of top slots between said top support member and said side support members, said body further includes a pair of center support members and a pair of bottom support members, said center support members and said bottom support members defining a pair of side slots and a bottom slot, said primary retainer includes a cross member overlying said top support member with said legs extending through said top slots, said redundant latch/verifier includes a connecting member overlying said bottom slot with said fingers disposed in said side slots.

20. The quick connector coupling as claimed in claim 19 wherein said bottom support members include laterally directed locking ridges, each of said fingers defines a hook having a notch, said notch releasably receives said locking ridge when said redundant latch/verifier is in said unlatched position.

21. The quick connector coupling as claimed in claim 20 wherein each of said fingers includes a retention area, said retention area receives said locking ridge of said bottom support member when said redundant latch/verifier is in said latched position.

22. The quick connector coupling as claimed in claim 21 wherein each of said fingers define a transition surface between said notch and said retention area.

23. The quick connector coupling as claimed in claim 22 wherein each of said transition surface includes a laterally enlarged locking nub.

24. The quick connector coupling as claimed in claim 23 wherein said locking nub is in abutting relationship with said locking ridge when said redundant latch/verifier is in said latched position.

25. The quick connector coupling as claimed in claim 19 wherein said center support members each define a locking shoulder and said legs each define a latch, said latch of each said leg releasably secured to a locking shoulder of one of said center support members when said primary retainer is in said locked position.

26. A quick connector coupling for forming a severable connection in a fluid line comprising:

a connector body defining a through bore extending axially rearward from a male reception end of said connector body, wherein said connector body includes a forward rim defining a rearward facing surface and a rearward rim defining a forward facing surface, a plurality of support members extending between said surfaces, including a top support member, a pair of side support members spaced therefrom and defining a pair of top slots between said top support member and said side support members, said body further includes a pair of center support members and a pair of bottom support members, said center support members and said bottom support members defining a pair of side slots and a bottom slot, said connector body includes locking pads on said rearward facing surface within said side slots extending radially inward;

a male member extending through said male reception end of connector body and into said bore, said male member having a tubular surface and an annular upset, said upset having a diameter greater than the diameter of said tubular surface;

a primary retainer to releasably secure said male member within said connector body including a cross member and including spaced apart legs extending through said top slots into said side slots and movable between a locked position and a released position in which the spacing between said legs is increased;

wherein said legs are located laterally inward of said locking pads, when said male member is pulled axially forward toward said male reception end of said body.

27. The quick connector coupling as claimed in claim 26 further comprises a separate redundant latch/verifier releasably coupled to said connector body and is movable relative to said connector body toward and away from said primary retainer between an unlatched position and a latched position.

28. The quick connector coupling as claimed in claim 27 wherein said redundant latch/verifier includes a retainer beam slidable in a slot defined in said connector body.

29. The quick connector coupling as claimed in claim 28 wherein said retainer beam is of a length such that it is exposed in said through bore when said redundant latch/verifier is in said latched position.

30. The quick connector coupling as claimed in claim 28 wherein said retainer beam includes a surface in axial abutting relationship with said upset of said male member when the male member is fully inserted into the connector body.

31. The quick connector coupling as claimed in claim 28 wherein said slot is "T" shaped in cross section and said retainer beam of said redundant latch/verifier is "T" shaped in cross section, said retainer beam being slidably supported in said slot.

32. The quick connector coupling as claimed in claim 28 wherein said retainer beam extends from a connection member and said fingers extends from said connection member in the same direction as said retainer beam.

33. The quick connector coupling as claimed in claim 27 wherein said redundant latch/verifier includes spaced apart fingers.

34. The quick connector coupling as claimed in claim 33 wherein each finger includes a verifying tab, said redundant latch/verifier is movable between said unlatched position and said latched position only if said annular upset of said male member is in contact with said verifying tabs.

35. The quick connector coupling as claimed in claim 26 wherein said legs are connected by a cross member and are movable laterally between said locked position and said released position by pressing said cross member toward said connector body.

36. The quick connector coupling as claimed in claim 35 wherein said bottom support members include laterally directed locking ridges, each of said fingers defines a hook having a notch, said notch releasably receives said locking ridge when said redundant latch/verifier is in said unlatched position.

37. The quick connector coupling as claimed in claim 36 wherein each of said fingers includes a retention area, said retention area receives said locking ridge of said bottom support member when said redundant latch/verifier is in said latched position.

38. The quick connector coupling as claimed in claim 37 wherein each of said fingers define a transition surface between said notch and said retention area.

39. The quick connector coupling as claimed in claim 35 wherein said center support members each define a locking shoulder and said legs each define a latch, said latch of each said leg releasably secured to a locking shoulder of one of said center support members when said primary retainer is in said locked position.

* * * * *

UNITED STATES PATENT AND TRADEMARK OFFICE
CERTIFICATE OF CORRECTION

PATENT NO. : 7,484,774 B2  Page 1 of 1
APPLICATION NO. : 11/411504
DATED : February 3, 2009
INVENTOR(S) : Jim Kerin et al.

It is certified that error appears in the above-identified patent and that said Letters Patent is hereby corrected as shown below:

<u>Col. 20, Claim 6</u>
Line 2, replace "scat" with --seat--

<u>Col. 21, Claim 15</u>
Line 11, replace "frilly" with --fully--

Signed and Sealed this

Twenty-eighth Day of April, 2009

JOHN DOLL
*Acting Director of the United States Patent and Trademark Office*